(12) United States Patent
Hasegawa

(10) Patent No.: US 9,571,613 B2
(45) Date of Patent: Feb. 14, 2017

(54) PORTABLE TERMINAL DEVICE THAT SELECTS LOWEST AMOUNT OF POWER CONSUMED BY A SENSOR AND SENSOR'S DRIVER

(71) Applicant: FUJITSU LIMITED, Kawasaki-shi, Kanagawa (JP)

(72) Inventor: Eiji Hasegawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/729,397

(22) Filed: Jun. 3, 2015

(65) Prior Publication Data
US 2016/0006470 A1    Jan. 7, 2016

(30) Foreign Application Priority Data

Jul. 2, 2014 (JP) ................. 2014-137212

(51) Int. Cl.
| | | |
|---|---|---|
| H04B 1/38 | (2015.01) | |
| H04B 7/00 | (2006.01) | |
| H04M 1/02 | (2006.01) | |
| G06F 1/32 | (2006.01) | |
| H04W 52/02 | (2009.01) | |

(52) U.S. Cl.
CPC .......... *H04M 1/0202* (2013.01); *G06F 1/3206* (2013.01); *G06F 1/3212* (2013.01); *H04W 52/0251* (2013.01); *H04W 52/0261* (2013.01)

(58) Field of Classification Search
CPC .................. H04W 52/0261; H04W 52/0229
USPC .......................... 455/41.2, 41.3, 572
See application file for complete search history.

(56) References Cited

U.S. PATENT DOCUMENTS

| 2004/0102228 A1* | 5/2004 | Hakamata ......... H04W 52/0261 455/572 |
| 2005/0070227 A1* | 3/2005 | Shen ...................... H04B 1/44 455/41.3 |
| 2012/0003932 A1* | 1/2012 | Zhodzishsky ..... H04W 52/0229 455/41.2 |

FOREIGN PATENT DOCUMENTS

| JP | 2003-157155 | 5/2003 |
| WO | 2010/107107 A1 | 9/2010 |

* cited by examiner

*Primary Examiner* — William D Cumming
(74) *Attorney, Agent, or Firm* — Staas & Halsey LLP

(57) ABSTRACT

A portable terminal device includes: a memory to store power data; and a processor to execute a process, the process including: receiving an instruction to execute sensing; specifying one or more sensors for executing the sensing or one or more drivers controlling the sensors so that devices including the specified sensor and driver are specified; calculating a power consumed for the sensing by the specified devices based on the power data; and selecting a combination of the driver and the sensor, having a minimum power consumed for the sensing by the specified devices.

6 Claims, 19 Drawing Sheets

| DEVICE | OPERATING POWER |
|---|---|
| BLE CHIP 11a | 3mA |
| WALK SENSOR 11b | 1mA |
| BLE CHIP 11c | 2mA |
| WALK SENSOR 11d | 1mA |
| SENSOR MICROCOMPUTER 12cd | 4mA |
| CPU 14 | 20mA |

| SENSING TYPE | SENSOR DRIVER | OPERATING DEVICE |
|---|---|---|
| BLE SENSING | BLE DRIVER 15A | BLE CHIP 11a |
| | SENSOR MICROCOMPUTER DRIVER 15CD | BLE CHIP 11c + SENSOR MICROCOMPUTER 12cd |

FIG.5

| COMBINATION | OPERATING DEVICE | POWER CONSUMPTION |
|---|---|---|
| BLE DRIVER 15A | BLE CHIP 11a | 3mA |
| SENSOR MICROCOMPUTER DRIVER 15CD | BLE CHIP 11c + SENSOR MICROCOMPUTER 12cd | 6mA |

FIG.6

| SENSING TYPE | SENSOR DRIVER | OPERATING DEVICE |
|---|---|---|
| BLE SENSING | BLE DRIVER 15A | BLE CHIP 11a |
| | SENSOR MICROCOMPUTER DRIVER 15CD | BLE CHIP 11c + SENSOR MICROCOMPUTER 12cd |
| WALK SENSING | WALK SENSOR DRIVER 15B | WALK SENSOR 11b + CPU 14 |
| | SENSOR MICROCOMPUTER DRIVER 15CD | WALK SENSOR 11d + SENSOR MICROCOMPUTER 12cd |

FIG.7

| COMBINATION | OPERATING DEVICE | POWER CONSUMPTION |
|---|---|---|
| BLE DRIVER 15A + WALK SENSOR DRIVER 15B | BLE CHIP 11a + WALK SENSOR 11b + CPU 14 | 24mA |
| SENSOR MICROCOMPUTER DRIVER 15CD + WALK SENSOR DRIVER 15B | BLE CHIP 11c + SENSOR MICROCOMPUTER 12cd + WALK SENSOR 11b + CPU 14 | 27mA |
| BLE DRIVER 15A + SENSOR MICROCOMPUTER DRIVER 15CD | BLE CHIP 11a + WALK SENSOR 11d + SENSOR MICROCOMPUTER 12cd | 8mA |
| SENSOR MICROCOMPUTER DRIVER 15CD + SENSOR MICROCOMPUTER DRIVER 15CD | BLE CHIP 11c + WALK SENSOR 11d + SENSOR MICROCOMPUTER 12cd | 7mA |

FIG.16

| DEVICE | OPERATION STATE | |
|---|---|---|
| BLE CHIP 11a | ✗ | 31a |
| WALK SENSOR 11b | ✗ | |
| BLE CHIP 11c | ✗ | |
| WALK SENSOR 11d | ○ | |
| SENSOR MICROCOMPUTER 12cd | ○ | |
| CPU 32 | ✗ | | t0

⇩

| DEVICE | OPERATION STATE | |
|---|---|---|
| BLE CHIP 11a | ✗ | 31a |
| WALK SENSOR 11b | ✗ | |
| BLE CHIP 11c | ○ | |
| WALK SENSOR 11d | ○ | |
| SENSOR MICROCOMPUTER 12cd | ○ | |
| CPU 32 | ✗ | | t1

FIG.17

| ADDED COMBINATION OF DRIVERS | ADDED OPERATING DEVICE | OPERATING DEVICE BEFORE BEING ADDED | POWER CONSUMPTION INCREMENT |
|---|---|---|---|
| BLE DRIVER 15A | BLE CHIP 11a | SENSOR MICROCOMPUTER 12cd, WALK SENSOR 11d | 3mA |
| SENSOR MICROCOMPUTER DRIVER 15CD | BLE CHIP 11c + SENSOR MICROCOMPUTER 12cd | SENSOR MICROCOMPUTER 12cd, WALK SENSOR 11d | 2(=2+4-4)mA |

FIG.18 t0

| DEVICE | OPERATION STATE | 31a |
|---|---|---|
| BLE CHIP 11a | ○ | |
| WALK SENSOR 11b | × | |
| BLE CHIP 11c | × | |
| WALK SENSOR 11d | × | |
| SENSOR MICROCOMPUTER 12cd | × | |
| CPU 32 | × | |

⇩ t1

| DEVICE | OPERATION STATE | 31a |
|---|---|---|
| BLE CHIP 11a | ○ | |
| WALK SENSOR 11b | × | |
| BLE CHIP 11c | × | |
| WALK SENSOR 11d | ○ | |
| SENSOR MICROCOMPUTER 12cd | ○ | |
| CPU 32 | × | |

FIG.19

| ADDED COMBINATION OF DRIVERS | ADDED OPERATING DEVICE | OPERATING DEVICE BEFORE BEING ADDED | POWER CONSUMPTION INCREMENT |
|---|---|---|---|
| WALK SENSOR DRIVER 15B | WALK SENSOR 11b + CPU 32 | BLE CHIP 11a | 21(=1+20)mA |
| SENSOR MICROCOMPUTER DRIVER 15CD | WALK SENSOR 11d + SENSOR MICROCOMPUTER 12cd | BLE CHIP 11a | 5(=1+4)mA |

US 9,571,613 B2

PORTABLE TERMINAL DEVICE THAT SELECTS LOWEST AMOUNT OF POWER CONSUMED BY A SENSOR AND SENSOR'S DRIVER

CROSS-REFERENCE TO RELATED APPLICATION

This application is based upon and claims the benefit of priority from the prior Japanese Patent Application No. 2014-137212 filed on Jul. 2, 2014, the entire contents of which are incorporated herein by reference.

FIELD

The embodiments discussed herein are related to a portable terminal device having sensors.

BACKGROUND

An application program using various sensors is installed in a portable terminal device represented by a smart phone. As the portable terminal device is multi-functionalized, a plurality of sensors of the same type may be equipped in the portable terminal device.

Related techniques are disclosed in, for example, International Publication Pamphlet No. WO 2010/107107 and Japanese Laid-Open Patent Publication No. 2003-157155.

SUMMARY

According to an aspect of the invention, a portable terminal device includes: a memory to store power data; and a processor to execute a process, the process including: receiving an instruction to execute sensing; specifying one or more sensors for executing the sensing or one or more drivers controlling the sensors so that devices including the specified sensor and driver are specified; calculating a power consumed for the sensing by the specified devices based on the power data; and selecting a combination of the driver and the sensor, having a minimum power consumed for the sensing by the specified devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an exemplary configuration of a correspondence relationship table;

FIG. 5 is a diagram illustrating an example of a calculation result of power consumption;

FIG. 6 is a diagram illustrating another exemplary configuration of the correspondence relationship table;

FIG. 7 is a diagram illustrating another example of the calculation result of power consumption;

FIG. 16 is a diagram illustrating an example of transition of operation state data;

FIG. 17 is a diagram illustrating another example of the calculation result of power consumption;

FIG. 18 is a diagram illustrating another example of the transition of request data;

FIG. 19 is a diagram illustrating an example of a calculation result for an increment portion of power consumption;

DESCRIPTION OF EMBODIMENTS

In the related art, the power consumption of a sensor used in an application being executed is not always smaller than the power consumption of a sensor in an application not being executed. Accordingly, there is a case where the power consumption of the sensor may cause a problem.

Hereinafter, descriptions will be made on a portable terminal device equipped with a plurality of sensors according to the present disclosure with reference to the accompanying drawings. In the meantime, the present disclosure is not limited to the embodiments. Also, respective embodiments may be appropriately combined with each other within a scope in which inconsistency between processing contents are not caused.

First Embodiment
[Configuration of Portable Terminal Device]

Figure 1:
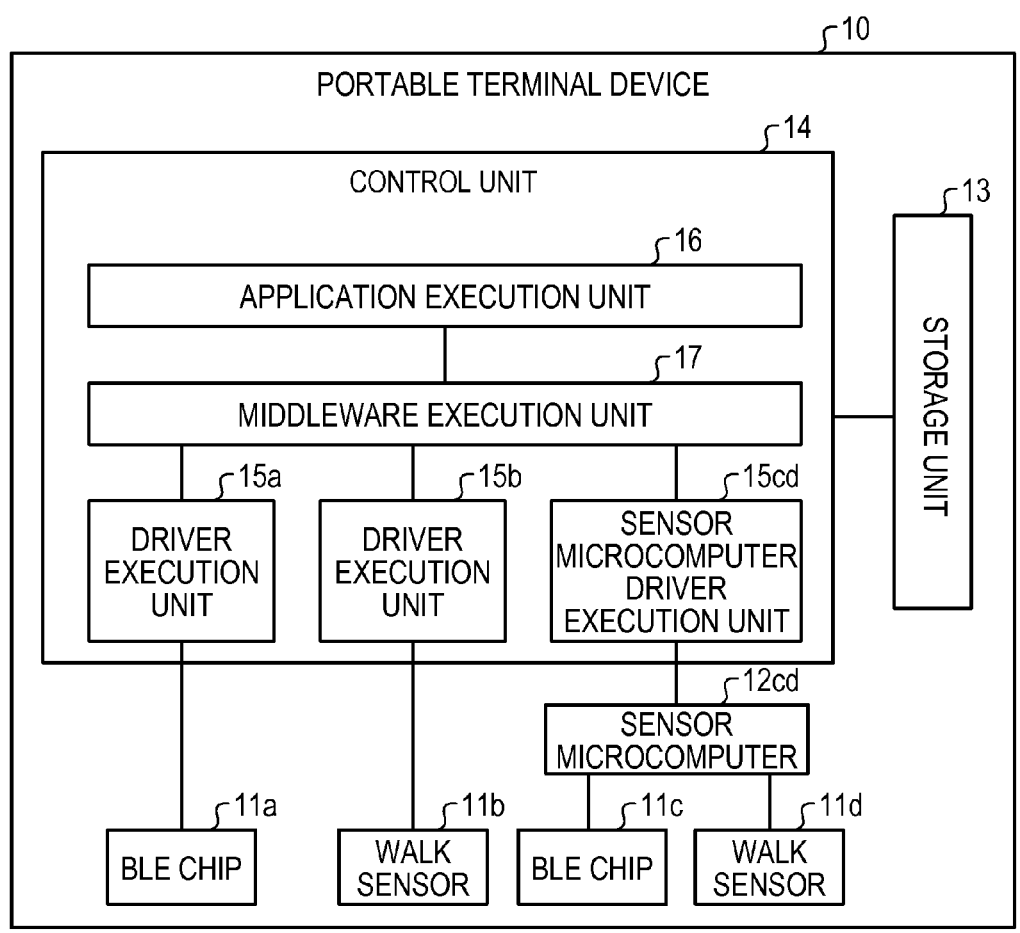
FIG. 1 is a block diagram illustrating a functional configuration of an exemplary portable terminal device according to First Embodiment.

Hereinafter, the term "sensing" is used to indicate measuring and determining a physical quantity such as sound, light, temperature using a sensor. First, descriptions will be made on a functional configuration of a portable terminal device according to the present embodiment. FIG. 1 is a block diagram illustrating a functional configuration of a portable terminal device 10 according to First Embodiment. The portable terminal device 10 illustrated in FIG. 1 executes a sensing control in which a sensing request made by an application program running on the portable terminal device 10 is executed using a sensor under the control of the portable terminal device 10.

As a part of the sensing control, the portable terminal device 10 selects a sensor which consumes a less power than a case where sensing is executed using other sensors among the sensors under the control of the portable terminal device 10 when various types of sensors capable of achieving the same sensing exist. Therefore, the portable terminal device 10 suppresses, for example, the power consumption for sensing.

In one embodiment, a sensing control program which provides the sensing control described above to, for example, the application program running on the portable terminal device 10 as an API (Application Programming Interface) may be installed in various computers as middleware to be equipped in the portable terminal device 10. The sensing control program may be provided as either a packaged software or an online software. For example, the sensing control program may be installed in a mobile communication terminal such as a smart phone, a mobile phone or a PHS (Personal Handyphone System) and in a portable terminal device including, for example, a tablet terminal or a slate terminal. Therefore, the sensing control described above may be executed by the portable terminal device 10.

In the meantime, here, the following descriptions will be made on the portable terminal device 10 by way of an example of an apparatus in which the sensing control program is installed, but the sensing control program needs not necessarily be installed in the portable terminal device 10. For example, the sensing control program may be installed in the whole of the information processing apparatus including a stationary terminal device and a personal computer.

As illustrated in FIG. 1, the portable terminal device 10 includes a BLE (Bluetooth (registered trademark) Low Energy) chip 11a, a walk sensor 11b, a BLE chip 11c, and a walk sensor 11d as examples of sensors.

Both the BLE chip 11a and the BLE chip 11c are chips to perform a communication over the BLE with other apparatuses. Each of the BLE chip 11a and BLE chip 11c is capable of sensing a BLE compliant device. In the meantime, the BLE is exemplified here as a short-range wireless communication, but the short-range wireless communication may be performed in accordance with other wireless communication standards than the BLE.

Among the BLE chips, the difference between the BLE chip 11a and the BLE chip 11c is that the BLE chip 11a is utilized by a driver executed by a control unit 14 without requiring an intervention of other device, while a sensor microcomputer 12cd is intervened between the BLE chip 11c and a driver executed by the control unit 14.

A microcomputer (not illustrated) is installed in the BLE chip 11a and the BLE chip 11c. The microcomputer executes a notification to the control unit 14 by being narrowed to a case where the notification may be made to the control unit 14 when a predetermined notification condition such as, for example, a threshold value is satisfied. Accordingly, when a BLE sensing is executed, the control unit 14 may be in a sleep state until the notification condition is satisfied.

Both the walk sensor 11b and the walk sensor 11d are sensors to acquire walk data. Among these sensors, the difference between the walk sensor 11b and the walk sensor 11d is that the walk sensor 11b is utilized by a driver executed by the control unit 14 without requiring an intervention of other device, while a sensor microcomputer 12cd is intervened between the BLE chip 11c and a driver executed by the control unit 14.

In one embodiment, the walk sensor 11b and the walk sensor 11d may employ a motion sensor such as a triaxial acceleration sensor. For example, the walk sensors are capable of sensing, for example, a walk or a quick walk using a triaxial acceleration data acquired by the motion sensor as an example of walk data. Further, the walk sensors are also capable of sensing more accurate walk data using a posture component obtained from a sensor such as a geomagnetic sensor or a gyro sensor together with the sensed walk or quick walk.

Further, the portable terminal device 10 includes the sensor microcomputer 12cd as an example of a sensing processor as illustrated in FIG. 1.

The sensor microcomputer 12cd is so called a microcomputer, that is, a microprocessor which controls the sensing operation performed by the BLE chip 11c and the walk sensor 11d.

In one embodiment, the sensor microcomputer 12cd may combine sensor outputs from the BLE chip 11c and the walk sensor 11d to determine a composite notification condition. Also, the sensor microcomputer 12cd executes a notification to the control unit 14 by narrowing the situation to a case where the notification may be made to the control unit 14 when the predetermined notification condition is satisfied. Accordingly, when a sensor under the control of the sensor microcomputer 12cd executes a sensing operation, the control unit 14 may be in a sleep state until the notification condition is satisfied.

Further, the portable terminal device 10 includes a storage unit 13 as a main storage device and the control unit 14 as a central processing unit as illustrated in FIG. 1.

The storage unit 13 is a storage device which stores data used for various programs such as an OS (Operating System), a middleware, and an application program executed in the control unit 14.

In one embodiment, the storage unit 13 is installed as the main storage device in the portable terminal device 10. For example, various semiconductor memory devices such as, for example, a RAM (Random Access Memory), a ROM (Read Only Memory), or a flash memory may be employed in the storage unit 13. Further, the storage unit 13 may be installed as an auxiliary storage device. In this case, a device such as an SSD (Solid State Drive) may be employed in addition to a removable medium such as a USB (Universal Serial Bus) memory or an SD (Secure Digital) card.

The control unit 14 includes an internal memory which stores various programs or control data, and executes various processings using the programs or data.

In one embodiment, the control unit 14 is installed as a central processing unit, so called a CPU. In the following, descriptions may be made by describing the control unit as a "CPU" in an assumption that the control unit is installed as the CPU. In the meantime, the control unit 14 needs not necessarily be installed as the central processing unit and may be installed as an MPU (Micro Processing Unit). Further, the control unit 14 may be implemented by a hard-wired logic such as an ASIC (Application Specific Integrated Circuit) or FPGA (Field Programmable Gate Array).

The control unit 14 executes various programs to virtually implement processing units to be described below. For example, the control unit 14 includes a driver execution unit 15a, a driver execution unit 15b, a sensor microcomputer driver execution unit 15cd, an application execution unit 16, and a middleware execution unit 17 as illustrated in FIG. 1.

The driver execution unit 15a, the driver execution unit 15b, and the sensor microcomputer driver execution unit 15cd are processing units which execute software such as, so called a driver, which controls a sensor under the control of the portable terminal device 10.

Among these execution units, the driver execution unit 15a executes a driver corresponding to the BLE chip 11a and the driver execution unit 15b executes a driver corresponding to the walk sensor 11b. Further, the sensor microcomputer driver execution unit 15cd executes a driver corresponding to the sensor microcomputer 12cd.

The application execution unit 16 is a processing unit that executes various application programs.

In one embodiment, the application execution unit 16 may execute an arbitrary application program. The application program may also be pre-installed in the portable terminal device 10, downloaded from an external apparatus, or acquired from a removable medium connected either by wired or wirelessly. For example, when an instruction to activate an application program is issued by manipulation of a user, the application execution unit 16 activates the application program. Further, the application execution unit 16 may operate the application in a background. In this case, the application program operates within a range of authority given by the user of the portable terminal device 10 according to a condition determined by a manufacturer of the portable terminal device 10 or an issuance source of the application program. In the meantime, a plurality of application programs may be executed in parallel by a multitasking.

Here, the application program may place a sensing request to the middleware executed in the middleware execution unit 17. For example, when the application program relative to an SNS (Social Networking Service) or a game is executed, StreetPass Communication by short-range wireless communication may be established with another terminal. In this case, an instruction to perform the BLE sensing is issued to the middleware from the application program. Further, when an application program about a health management, that is, an application program which calculates, for example, calorie consumption is executed, the number-of-steps of walk or quick walk may be used in calculating the calorie consumption. In this case, an instruction to perform a walk sensing is issued to the middleware from the application program.

The middleware execution unit 17 is a processing unit that executes a sensing control program provided as a middleware.

Figure 2:
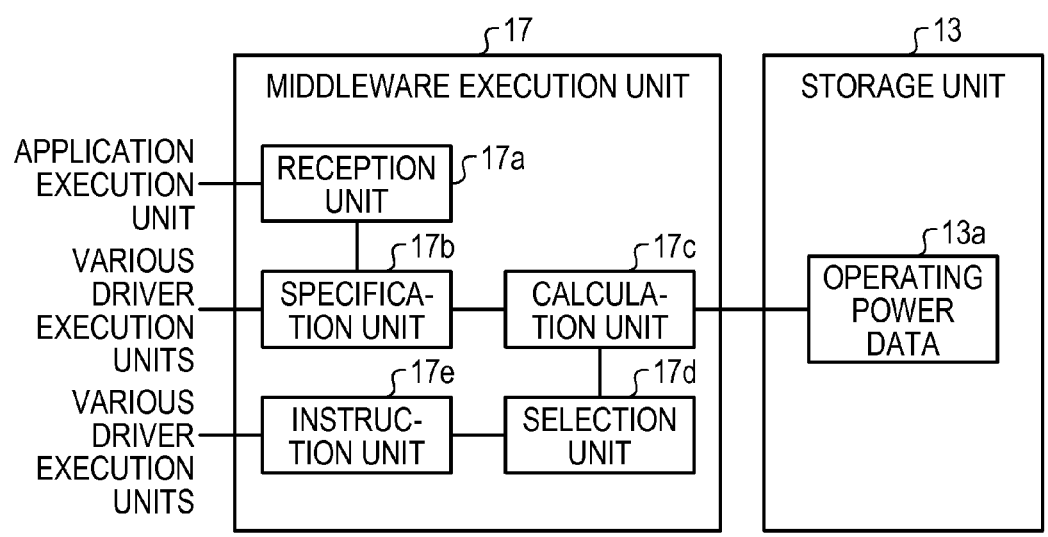
FIG. 2 is a block diagram illustrating a functional configuration of an exemplary middleware execution unit according to First Embodiment.

FIG. 2 is a block diagram illustrating a functional configuration of a middleware execution unit 17 according to First Embodiment. As illustrated in FIG. 2, the middleware execution unit 17 includes a reception unit 17a, a specification unit 17b, a calculation unit 17c, a selection unit 17d, and an instruction unit 17e.

The reception unit 17a is a processing unit that receives various instructions from the application program.

In one embodiment, the reception unit 17a receives a sensing request from the application program executed by the application execution unit 16 according to an API provided by the sensing control program. The sensing request may include, for example, a sensing type and other information such as a sensing period of time. In this manner, when a sensing request is received, the reception unit 17a notifies the specification unit 17b of the sensing request.

The specification unit 17b is a processing unit which specifies a device to be operated during execution of the sensing for each combination of sensors or drivers that implement a single or a plurality of sensing for which a request is received from the application program.

In one embodiment, when the sensing request is received from the application program being executed by the application execution unit 16, the specification unit 17b derives a combination of drivers which implement the sensing for the request. For example, the specification unit 17b inquires the respective driver execution units 15a, 15b, and 15cd being executed in the control unit 14 of whether the sensing for which the request is received by the reception unit 17a is capable of being executed to derive the combination of drivers. Further, the specification unit 17b may retrieve the combination of drivers being corresponded to the type of sensing for which the request is received to derive the combination of drivers by referencing a correspondence relationship table in which a type of sensing and a combination of drivers are defined. As described above, the specification unit 17b may derive the combination of drivers by either the inquiry or the retrieval. In this case, when various combinations of drivers that implement the sensing for which the request is received exist, the specification unit 17b derives all combinations of drivers. In the meantime, here, as an example, a combination of drivers is extracted, but a combination of sensors may be derived.

Thereafter, the specification unit 17b selects one combination of drivers among the combinations of drivers. Subsequently, the specification unit 17b specifies a device to be operated during the execution of the sensing from the combination of drivers selected at previous time. That is, the specification unit 17b specifies whether only a sensor which is an end hardware is required to be operated, a CPU 14 capable of executing a determination using a sensor output is also necessarily required to be operated, or a sensing processor such as the sensor microcomputer 12cd is required to be operated instead of the CPU 14 in executing the sensing. With this configuration, the device described above may include a processor along with a sensor. In the following, the device to be operated during execution of the sensing may be described as an "operating device". In this case, in a case of the inquiry described above, when the sensing operation can be executed, the operating device may also be included in a reply along with whether the sensing is allowed or not. Further, in a case of the retrieval described above, the operating device may also be added in the correspondence relationship table to be corresponded as an item of the relationship table.

The calculation unit 17c is a processing unit that calculates a power consumed for the sensing by the operating device for each combination.

Figure 3:
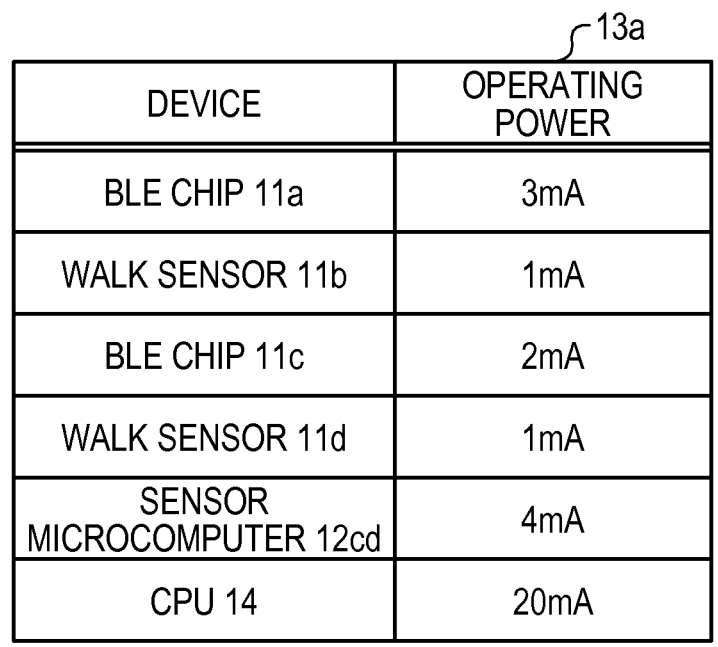
FIG. 3 is a diagram illustrating an example of operating power data.

In one embodiment, the calculation unit 17c references the operating power data 13a stored in the storage unit 13 to calculate a power consumed for the sensing by each operating device each time when the operating device is specified by the specification unit 17b. For example, data in which items such as a device and an operating power are corresponded to each other may be employed in the operating power data 13a. FIG. 3 is a diagram illustrating an example of the operating power data 13a. In FIG. 3, the operating power of the respective devices of the BLE chip 11a, the walk sensor 11b, the BLE chip 11c, the walk sensor 11d, the sensor microcomputer 12cd, and the CPU 14 are exemplified. For example, the example of FIG. 3 indicates that even though the BLE chip 11a and the BLE chip 11c are the same type of BLE sensor, the BLE chip 11c consumes only "2 mA" for operation while the BLE chip 11a consumes "3 mA" for operation. Further, an operating power of the CPU 14 is "20 mA" which is the maximum value of the operating power in FIG. 3 and also indicates that more than double the operating powers of other devices is consumed for operation by the CPU 14. With the operating powers, the calculation unit 17c retrieves the operating power corresponding to each device to be operated during execution of the sensing.

Thereafter, the calculation unit 17c calculates the power consumption for a case where each device executes a sensing by combining a total operating power of each device.

The selection unit 17d is a processing unit that selects the combination having the minimum power consumption during an execution of the sensing.

In one embodiment, each time when the power consumption is calculated by the calculation unit 17c, the selection unit 17d references an internal memory in which the minimum value of power consumption among the power consumption calculated up until now is stored to compare the calculated power consumption with the minimum value of the power consumption in magnitude. In this case, when the power consumption calculated by the calculation unit 17c is smaller than the minimum value stored in the internal memory, the selection unit 17d overwrites the minimum value with the power consumption calculated by the calculation unit 17c to store the calculated power consumption in the internal memory, that is, the minimum value in the internal memory is updated. In the meantime, when the power consumption calculated by the calculation unit 17c is equal to or greater than the minimum value stored in the internal memory. The selection unit 17d does not execute a storing operation of the calculated power consumption in the internal memory through overwriting. Further, when the minimum value is not stored in the internal memory, the power consumption calculated by the calculation unit 17c is stored in the internal memory as the minimum value. Thereafter, the selection unit 17d selects a combination of drivers for which the minimum value is stored in the internal memory was calculated as the power consumption during execution of the sensing after the power consumption is calculated for all combinations.

The instruction unit 17e is a processing unit that issues an instruction to execute a sensing.

In one embodiment, the instruction unit 17e instructs the driver included in the combination selected by the selection unit 17d to control an operating device to execute the sensing. As a result, the sensing corresponding to a sensing request is executed in the portable terminal device 10. As described above, the application program may request the sensing according to the API such that a source code may be prepared even though a use sequence of the sensors equipped in the portable terminal device 10 is not programmed.

In the meantime, the portable terminal device 10 may also be equipped with various functional units that are well known and included in a computer in addition to the functional units illustrated in FIG. 1. For example, when the portable terminal device 10 is installed as a tablet terminal or a slate terminal, the portable terminal device 10 may also be further equipped with an input device, a display device, a device capable of displaying and being inputted thereto. Further, when the portable terminal device 10 is installed as a mobile communication terminal, the portable terminal device 10 may further include functional units such as an antenna, a wireless communication unit connecting to wireless communication network, and a GPS (Global Positioning System) receiver.

Next, a specific example of a sensing control according to the present embodiment will be described with reference to FIG. 4 to FIG. 7. FIG. 4 and FIG. 6 are diagrams illustrating examples of a configuration of a correspondence relationship table. FIG. 5 and FIG. 7 are diagrams illustrating examples of a calculation result of power consumption. Among FIG. 4 to FIG. 7, a case where a BLE sensing is requested is illustrated in FIG. 4 and FIG. 5 while a case where the BLE sensing and a walk sensing are requested is illustrated in FIG. 6 and FIG. 7. In the meantime, here, as an example, descriptions will be made on differences between a sensing control used in the related art and a sensing control according to the present embodiment while contrasting the sensing controls of the present embodiment.

(1) BLE Sensing

For example, it is assumed that a request for the BLE sensing made from the application program is received by a reception unit 17a. In this case, for example, the correspondence relationship table illustrated in FIG. 4 is retrieved by the specification unit 17b. As a result, a BLE driver 15A which controls a BLE chip 11a and a sensor microcomputer driver 15CD which controls a BLE chip 11c are retrieved as the drivers which manage the sensors capable of executing the BLE sensing. In the present example, since only the BLE sensing is requested, the BLE driver 15A and the sensor microcomputer driver 15CD are derived as one of two combinations of drivers, respectively.

Among the two combinations of drivers, as for the combination of the BLE driver 15A, the BLE chip 11a is specified from the correspondence relationship table 4 illustrated in FIG. 4 as the operating device during the execution of the BLE sensing. Next, "3 mA" is acquired as the operating power corresponded to the BLE chip 11a by referencing the operating power data 13a illustrated in FIG. 3. Here, in the case of the combination of the BLE driver 15A, another operating device does not exist except for the BLE chip 11a. As a result, in a case of the combination of the BLE driver 15A, the power consumption during execution of the BLE sensing is calculated as "3 mA" as illustrated in FIG. 5.

In the meantime, as for the combination of the sensor microcomputer driver 15CD, the BLE chip 11c and the sensor microcomputer 12cd are specified from the correspondence relationship table 4 illustrated in FIG. 4 as the operating devices during the execution of the BLE sensing as illustrated in FIG. 5. Next, "2 mA" is acquired as the operating power corresponded to the BLE chip 11c, and "4 mA" is acquired as the operating power corresponded to the sensor microcomputer 12cd by referencing the operating power data 13a illustrated in FIG. 3. Accordingly, in a case of the combination of the sensor microcomputer driver 15CD, the power consumption during execution of the BLE sensing is calculated as "6 mA (=2 mA+4 mA)" as illustrated in FIG. 5.

As described above, the power consumption of "3 mA" is obtained for the combination of the BLE driver 15A, and the power consumption of "6 mA" is obtained for the combination of the sensor microcomputer driver 15CD. In this case, the combination of the BLE driver 15A having the smaller power consumption is selected. As a result, the instruction unit 17e issues an instruction to control the BLE chip 11a and execute the BLE sensing to the BLE driver 15A.

Accordingly, when the BLE sensing was requested, it is possible to suppress the instruction to execute the sensing from being issued to the combination of the sensor microcomputer driver 15CD having the power consumption greater than that of the combination of the BLE driver 15A, by the sensing control according to the present embodiment.

(2) BLE Sensing and Walk Sensing

Next, it is assumed that a request for BLE sensing and walk sensing made from the application program is received by a reception unit 17a. In this case, for example, the correspondence relationship table illustrated in FIG. 6 is retrieved by the specification unit 17b. As a result, the BLE driver 15A which controls the BLE chip 11a and the sensor microcomputer driver 15CD which controls the BLE chip 11c are retrieved as the drivers which manage the sensors capable of executing the BLE sensing. This is similar to "(1) BLE Sensing" described above. Further, the walk sensor driver 15B which controls the walk sensor 11b and the sensor microcomputer driver 15CD which controls the walk sensor 11d are retrieved as the drivers which manage the sensors capable of executing the walk sensing.

From the retrieved drivers, as for the combinations of the drivers that implement the BLE sensing and the walk sensing, the following (A), (B), (C), and (D) combinations of drivers may be derived.

(A) combination of the BLE driver 15A and the walk sensor driver 15B;
(B) combination of the sensor microcomputer driver 15CD and the walk sensor driver 15B;
(C) combination of the BLE driver 15A and the sensor microcomputer driver 15CD, and
(D) combination of the sensor microcomputer driver 15CD and the sensor microcomputer driver 15CD.

Among the combinations of (A) to (D), as for the (A) combination of the drivers, the BLE chip 11a is specified from the correspondence relationship table illustrated in FIG. 6 as the operating device during the execution of the BLE sensing, and the walk sensor 11b and the CPU 14 are specified from the correspondence relationship table illustrated in FIG. 6 as the operating devices during the execution of the walk sensing. Next, "3 mA" is acquired as the operating power of the BLE chip 11a, and "1 mA" is acquired as the operating power of the walk sensor 11b by referencing the operating power data 13a illustrated in FIG. 3. Accordingly, in a case of (A) combination of the drivers, the power consumption during the execution of the BLE sensing and the walk sensing is calculated as "24 mA (=1 mA+3 mA+20 mA)" as illustrated in FIG. 7.

Further, as for the (B) combination of the drivers, the BLE chip 11c and the sensor microcomputer 12cd are specified from the correspondence relationship table illustrated in FIG. 6 as the operating devices during the execution of the BLE sensing, and the walk sensor 11b and the CPU 14 are specified from the correspondence relationship table illustrated in FIG. 6 as the operating devices during execution of the walk sensing. Next, "2 mA" is acquired as the operating power of the BLE chip 11c, "4 mA" is acquired as the operating power of the sensor microcomputer 12cd and "1 mA" is acquired as the operating power of the walk sensor 11b, and "20 mA" is acquired as the operating power of the CPU 14, by referencing the operating power data 13a illustrated in FIG. 3. Accordingly, in a case of the (B) combination of the drivers, the power consumption during execution of the BLE sensing and the walk sensing is calculated as "27 mA (=2 mA+4 mA+1 mA+20 mA)" as illustrated in FIG. 7.

Further, as for the (C) combination of the drivers, the BLE chip 11a is specified from the correspondence relationship table illustrated in FIG. 6 as the operating device during the execution of the BLE sensing, and the walk sensor 11b and the sensor microcomputer 12cd are specified from the correspondence relationship table illustrated in FIG. 6 as the operating devices during execution of the walk sensing. Next, "3 mA" is acquired as the operating power of the BLE chip 11a, "1 mA" is acquired as the operating power of the walk sensor 11d, and "4 mA" is acquired as the operating power of the sensor microcomputer 12cd, by referencing the operating power data 13a illustrated in FIG. 3. Accordingly, in a case of the (C) combination of the drivers, the power consumption during execution of the BLE sensing and the walk sensing is calculated as "8 mA (=3 mA+1 mA+4 mA)" as illustrated in FIG. 7.

Further, as for the (D) combination of the drivers, the BLE chip 11c and the sensor microcomputer 12cd are specified from the correspondence relationship table illustrated in FIG. 6 as the operating devices during the execution of the BLE sensing, and the walk sensor 11d and the sensor microcomputer 12cd are specified from the correspondence relationship table illustrated in FIG. 6 as the operating devices during execution of the walk sensing. Here, in a case of the (D) combination of the drivers, the sensor microcomputer 12cd is redundantly specified as the operating device during the execution of both the BLE sensing and the walk sensing. As described above, when the operating device is redundantly specified, the operating device is specified by deleting one of the BLE sensing and the walk sensing. Next, "2 mA" is acquired as the operating power of the BLE chip 11c, "1 mA" is acquired as the operating power of the walk sensor 11d and "4 mA" is acquired as the operating power of the sensor microcomputer 12cd, by referencing the operating power data 13a illustrated in FIG. 3. Accordingly, in a case of the (D) combination of the drivers, the power consumption during the execution of the BLE sensing and the walk sensing is calculated as "7 mA (=2 mA+1 mA+4 mA)" as illustrated in FIG. 7.

As described above, the power consumption of "24 mA" is obtained for the (A) combination of the drivers, the power consumption of "27 mA" is obtained for the (B) combination of the drivers, the power consumption of "8 mA" is obtained for the (C) combination of the drivers, and the power consumption of "7 mA" is obtained for the (D) combination of the drivers. In this case, the (D) combination of the drivers having the minimum power consumption is selected. As a result, the instruction unit 17e issues an instruction to control the BLE chip 11c, the walk sensor 11d and the sensor microcomputer 12cd and execute the BLE sensing and the walk sensing to the sensor microcomputer driver 15CD.

Accordingly, by the sensing control according to the present embodiment, even when the BLE sensing and the walk sensing are requested, it is possible to suppress the instruction to execute the sensing from being issued to the (A), (B), and (C) combinations of the drivers each of which has the power consumption greater than that of the (D) combination of the drivers.

(3) Comparison with Related Art

In the meantime, as an example of the related art, it is assumed that a platform performs various manipulations on a media file or stream. In the platform, for example, in a case where a plurality of modules to decode the media file exists, a module to be used for decoding is selected according to a priority which is set for each module.

Here, in a case where the related art is applied to the selection of the operating device, for example, regarding the BLE sensing, a priority for execution is set for the BLE chip 11a and the BLE chip 11c so as to determine which one of the BLE chip 11a and the BLE chip 11c is to be selected for a preferential use. In this manner, when the priority for execution to select one of the devices for the preferential use is set, a power saving may not be achieved depending on the content of the sensing requested from the application program.

For example, when it is assumed that the BLE chip 11a is prioritized to be selected for the preferential use, the (A) combination of the drivers or the (C) combination of the drivers is selected in a case where the BLE sensing and the walk sensing are requested. Accordingly, the (D) combination of drivers, which may be selected in the sensing control according to the present embodiment, is not able to be selected in the sensing control according to the related art and thus the power saving is not achieved. In the meantime, even when it is assumed that the BLE chip 11c is prioritized to be selected for the preferential use, the combination of the sensor microcomputer driver 15CD which controls the BLE chip 11c is selected in a case where only the BLE sensing is requested. Accordingly, the combination of the BLE driver 15A, which may be selected in the sensing control according to the present embodiment, is not able to be selected in the sensing control according to the related art and the power saving is not achieved.

In the meantime, even when the sensing requested from the application program is either only the BLE sensing or both the BLE sensing and walk sensing, the power saving for the sensing may be achieved. As described above, by the sensing control according to the present embodiment, since the power saving for the sensing may be achieved without depending on the content of the sensing requested from the application program, an effect of power saving by the sensing control according to the present embodiment is greater than that by the sensing control according to the related art.

[Flow of Process]

Figure 8:
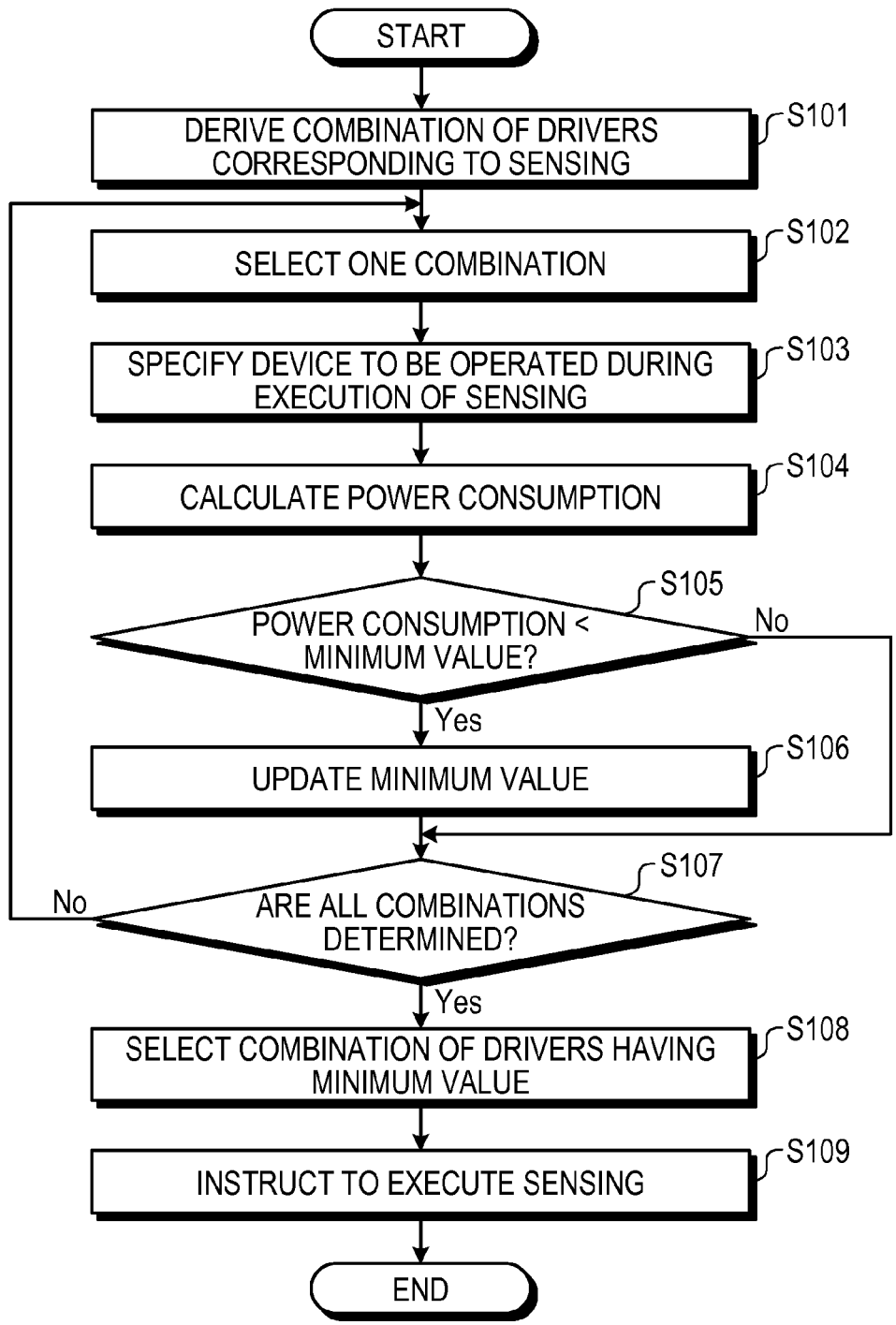
FIG. 8 is a flowchart illustrating a procedural sequence of a sensing control according to First Embodiment.

Next, descriptions will be made on a flow of a process executed by the portable terminal device according to the present embodiment. FIG. 8 is a flowchart illustrating a procedural sequence of sensing control according to First Embodiment. The process of the sensing control executed by the portable terminal device is executed when an instruction to execute a sensing is received from the application program.

As illustrated in FIG. 8, the specification unit 17b derives the combinations of drivers that implement the sensing for which a sensing request is received from the application program (Operation S101).

Next, the specification unit 17b selects one combination of drivers among the combinations of drivers derived at Operation S101 (Operation S102). Also, the specification unit 17b specifies a device to be operated during the execution of the sensing from the combination of drivers selected at Operation S102 (Operation S103).

Thereafter, the calculation unit 17c calculates a power consumed for the sensing by each device specified at Operation S103 by referencing the operating power data 13a stored in the storage unit 13 (Operation S104).

Here, the selection unit 17d compares the power consumption calculated at Operation S104 with the minimum value of the power consumption stored in the internal memory (Operation S105). In this case, when the power consumption calculated at Operation S104 is smaller than the minimum value of the power consumption stored in the internal memory ("YES" at Operation S105), the selection unit 17d overwrites the minimum value in the internal memory with the power consumption calculated at Operation S104 to store the calculated power consumption in the internal memory (Operation S106). In the meantime, when the power consumption calculated at Operation S104 is equal to or greater than the minimum value stored in the internal memory ("NO" at Operation S105), storing the calculated power consumption in the internal memory through overwriting is not executed, and the process proceeds to Operation S107.

Also, the processings of Operation S102 to Operation S106 are repeatedly executed until the comparisons of the power consumption with the minimum value for all combinations of the drivers are executed ("NO" at Operation S107).

Thereafter, when the comparisons of the power consumption with the minimum value for all combinations of drivers are executed ("YES" at Operation S107), the combination of drivers for which the minimum value stored in the internal memory is calculated as the power consumption during execution of the sensing is selected (Operation S108). Thereafter, the instruction unit 17e issues an instruction to control the operating device and execute the sensing to the driver included in the combination drivers selected at Operation S108 (Operation S109), and ends the process.

In the meantime, even though the processings of Operation S102 to Operation S106 are repeatedly executed in the flowchart illustrated in FIG. 8, the processings of Operation S102 to Operation S106 may be executed in parallel and then the combination of drivers having the smallest power consumption may be selected.

As having been described above, the portable terminal device 10 according to the present embodiment calculates the power consumption of the device to be operated during the execution of the sensing for each of various combinations of sensors capable of implementing the same sensing and selects the combination in which the minimum power is consumed by the device. Accordingly, it is possible to suppress the power consumption for the sensing by the portable terminal device 10 according to the present embodiment.

Second Embodiment

In the meantime, a case where the sensing request is received from a single application program is exemplified in First Embodiment, but the sensing request may be received from a plurality of application programs.

Accordingly, in the present embodiment, a case where the sensing requests are received from a plurality of application programs will be described by way of an example.

[Configuration of Portable Terminal Device 20]

Figure 9:
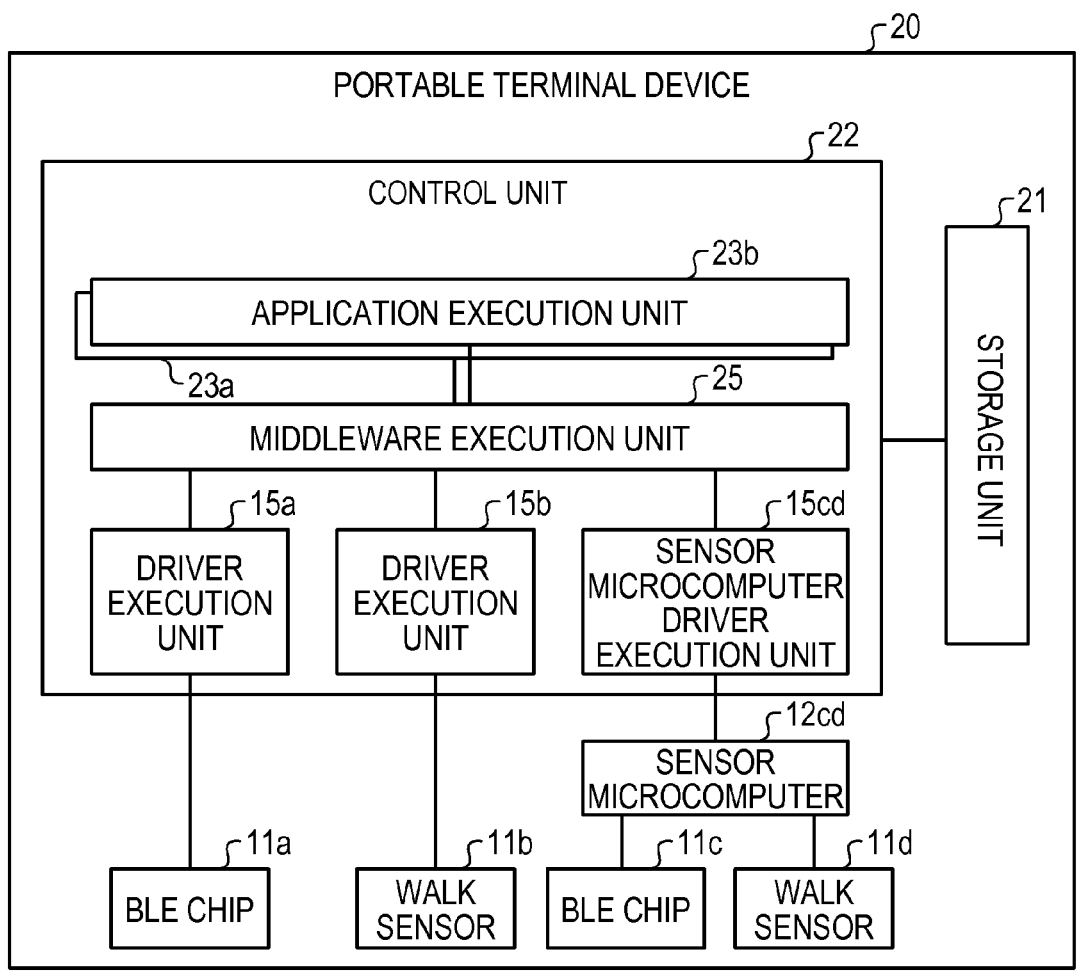
FIG. 9 is a block diagram illustrating a functional configuration of an exemplary portable terminal device according to Second Embodiment.

FIG. 9 is a block diagram illustrating a functional configuration of a portable terminal device 20 according to Second Embodiment. The portable terminal device 20 illustrated in FIG. 9 is different from the portable terminal device 10 illustrated in FIG. 1 in that a control unit 22 includes a plurality of application execution units 23a and 23b instead of the application execution unit 16, and also the contents of data stored in the storage unit 21 and processing contents executed by a control unit 22 in the portable terminal device 20 are also different from those stored in the storage unit 13 and those executed by a control unit 14 in the portable terminal device 10, respectively. In the meantime, in the following, the same reference numerals are given to the functional units that implement the same functions as those of the functional units illustrated in FIG. 1, and descriptions thereof will be omitted.

The application execution unit 23a and the application execution unit 23b are the processing units that execute various application programs similarly to the application execution unit 16 illustrated in FIG. 1. A plurality of application programs are executed in parallel by a multitasking in each of the application execution unit 23a and the application execution unit 23b. Hereinafter, the application execution unit 23a and the application execution unit 23b may be collectively referred to as an application execution unit 23. In the meantime, even though two application execution units are exemplified in FIG. 9, three or more application programs may be executed in parallel and the number of application execution units 23 is increased or decreased depending on the number of application programs.

Figure 10:
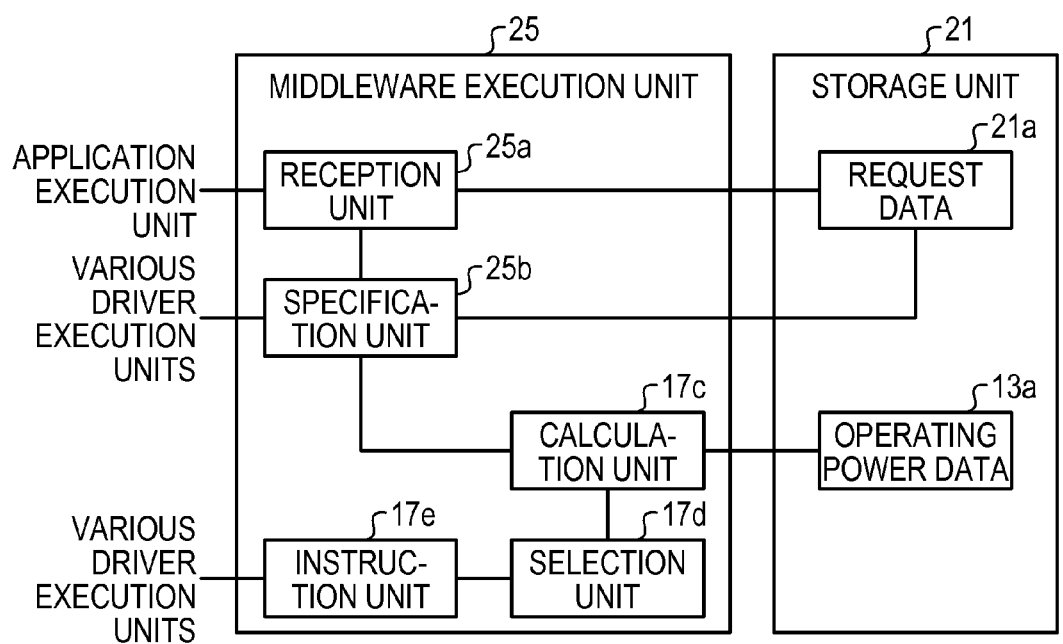
FIG. 10 is a block diagram illustrating a functional configuration of an exemplary middleware execution unit according to Second Embodiment.

FIG. 10 is a block diagram illustrating a functional configuration of a middleware execution unit 25 according to Second Embodiment. The middleware execution unit 25 illustrated in FIG. 10 is different from the middleware execution unit 17 illustrated in FIG. 2 in that the processing contents of a reception unit 25*a* and a specification unit 25*b* are different from those of the middleware execution unit 17.

The reception unit 25*a* receives various instructions from the application program such that an instruction to stop the sensing is also received in addition to an instruction to execute the sensing in First Embodiment, similarly to the reception unit 17*a* illustrated in FIG. 1.

In one embodiment, when the instruction to stop the sensing or the instruction to execute the sensing is received from the application program executed by the application execution unit 23, the reception unit 25*a* updates a request data 21*a* stored in the storage unit 21. A table in which the sensing being requested by the application operated in the portable terminal device 20 are listed may be employed in the request data 21*a*. For example, when the instruction to execute a sensing is received, the reception unit 25*a* adds the sensing for which the instruction to execute is received to the request data 21*a* to be registered. Further, when the instruction to stop the sensing is received, the reception unit 25*a* deletes the sensing for which the instruction to stop is received from the request data 21*a*.

The specification unit 25*b* specifies the operating device similarly to the specification unit 17*b* illustrated in FIG. 1, but different from the specification unit 17*b* in that an operating device for each combination of drivers is specified according to the request data 21*a* each time when the request data 21*a* stored in the storage unit 21 is updated.

Figure 11:
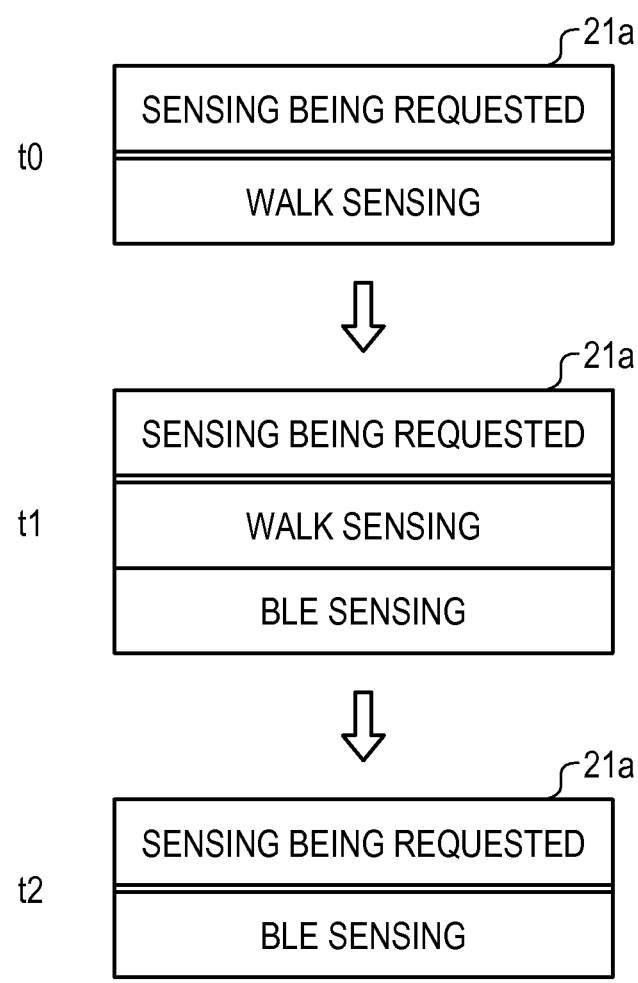
FIG. 11 is a diagram illustrating an example of a transition of request data.

Next, a specific example of the sensing control according to the present embodiment will be described with reference to FIG. 11. FIG. 11 is a diagram illustrating an example of a transition of the request data 21*a*. The request data 21*a* at time t0, time t1, and time t2 are illustrated in FIG. 11. In the meantime, it is assumed that the relationship between "t0", "t1", and "t2" is "t0<t1<t2".

As illustrated in FIG. 11, a state where a walk sensing is requested from an application program X at time t0 transits to a state where a BLE sensing is requested from an application program Y at time t1. In this case, a sensing control is executed to select a combination of drivers, in which the minimum power is consumed by the operating device, among the combinations of drivers that implement the BLE sensing and the walk sensing. The process and the result of the sensing control become the same as those of a specific example (2) of First Embodiment. That is, the (D) combination of drivers having the minimum power consumption is selected after the (A) to (D) combinations of drivers are derived.

Thereafter, the state transits to a state where the instruction to stop the walk sensing is received from the application program X at time t2. In this case, a sensing control is executed to select a combination of drivers, in which the minimum power is consumed by the operating device, among the combinations of the drivers that implement the BLE sensing. The process and the result of the sensing control become the same as those of a specific example (1) of First Embodiment. That is, a combination of the BLE driver 15A having the minimum power consumption is selected after the combination of the BLE driver 15A and the combination of the sensor microcomputer driver 15CD are derived. Consequently, the sensing control requests the sensor microcomputer driver 15CD to stop sensing, and requests the BLE driver 15A to start sensing.

As described above, the sensing control according to the present embodiment reselects the combination of the drivers in accordance with the change in the contents of the sensing requested from the application program. That is, when the instructions to execute the sensing are being issued by a plurality of application programs even when the instruction to execute the sensing is being issued by a single application program, or even when the instructions to execute the sensing are being issued by some of the application programs, the combination of drivers having the minimum power consumption may be selected. As a result, in the sensing control according to the present embodiment, for example, the power consumption may be suppressed even in a case where a plurality of application programs runs on the portable terminal device 20.

[Flow of Process]

Next, descriptions will be made on a flow of a process of the portable terminal device 20 according to the present embodiment. Here, descriptions on (1) a first sensing control executed by the portable terminal device 20 will be made first and then descriptions on (2) a second sensing control will be made.

(1) First Sensing Control

Figure 12:
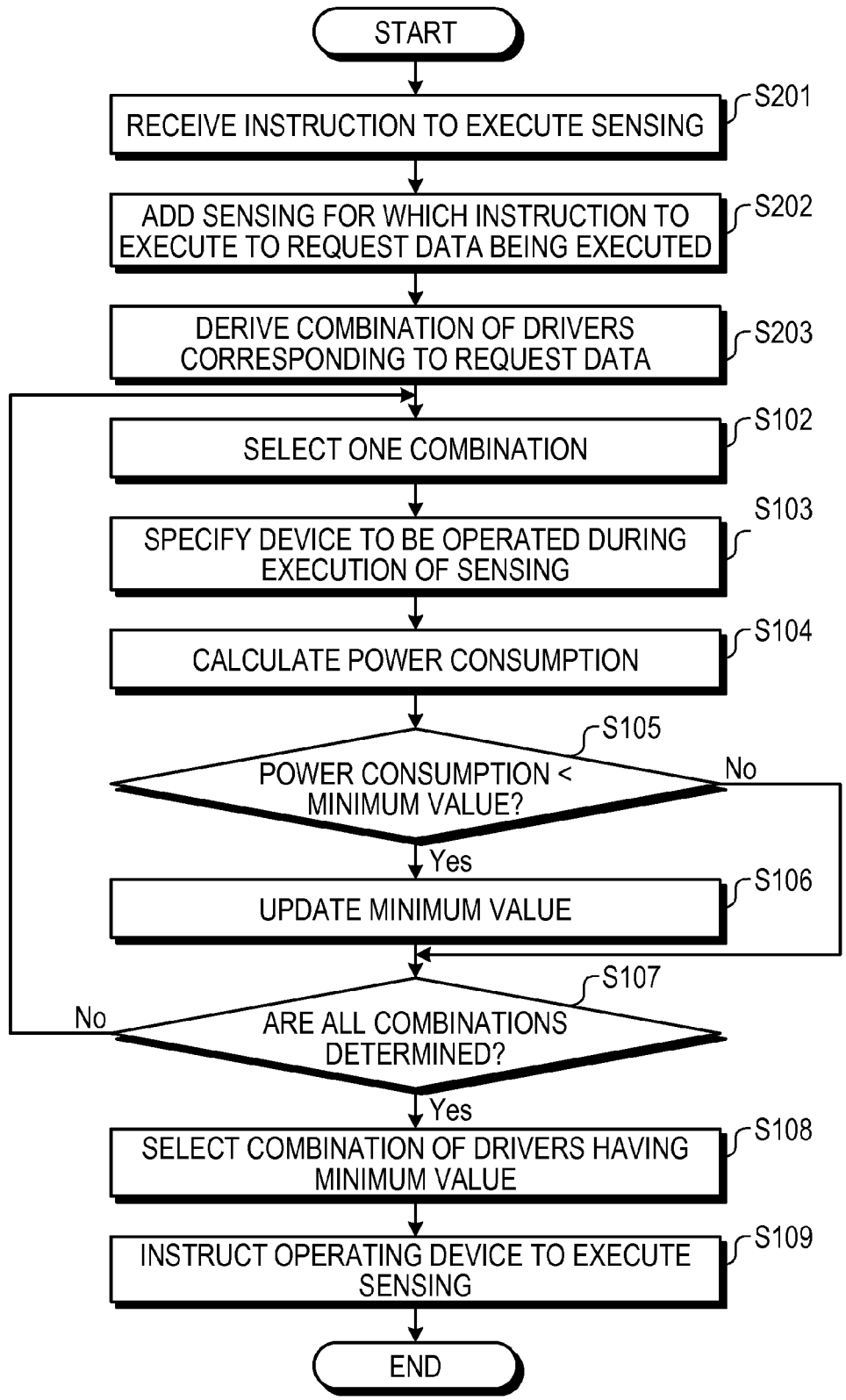
FIG. 12 is a flowchart illustrating a procedural sequence of a first sensing control according to Second Embodiment.

FIG. 12 is a flowchart illustrating a procedural sequence of a first sensing control according to Second Embodiment. The process of the first sensing control is executed when the instruction to execute a sensing is received from the application program. In the meantime, the same reference numerals are given to Operations by which the same process as that of the sensing control illustrated in FIG. 8 is executed.

As illustrated in FIG. 12, when the instruction to execute a sensing is received from the application program (Operation S201), the reception unit 25*a* adds the sensing for which the instruction to execute is received at Operation S201 to the request data 21*a* to be registered (Operation S202).

Next, the specification unit 25*b* derives the combinations of drivers according to the request data 21*a* in which the instruction to execute has been added and registered at Operation S202 (Operation S203).

Next, the specification unit 25*b* selects one combination of drivers among the combinations of drivers derived at Operation S203 (Operation S102). Also, the specification unit 25*b* specifies a device to be operated during the execution of the sensing from the combination of drivers selected at Operation S102 (Operation S103).

Thereafter, the calculation unit 17*c* calculates a power consumed for the sensing by each device specified at Operation S103 by referencing the operating power data 13*a* stored in the storage unit 13 (Operation S104).

Here, the selection unit 17*d* compares the power consumption calculated at Operation S104 with the minimum value of the power consumption stored in the internal memory (Operation S105). In this case, when the power consumption calculated at Operation S104 is smaller than the minimum value of the power consumption stored in the internal memory ("YES" at Operation S105), the selection unit 17*d* overwrites the minimum value in the internal memory with the power consumption calculated at Operation S104 to store the calculated power consumption in the internal memory (Operation S106). In the meantime, when the power consumption calculated at Operation S104 is equal to or greater than the minimum value stored in the internal memory ("NO" at Operation S105), storing the calculated power consumption in the internal memory through overwriting is not executed and the process proceeds to Operation S107.

Also, the processings of Operation S102 to Operation S106 are repeatedly executed until the comparisons of the power consumption with the minimum value for all combinations of the drivers are executed ("NO" at Operation S107).

Thereafter, when the comparisons of the power consumption with the minimum value for all combinations of the drivers are executed ("YES" at Operation S107), the selection unit 17d selects the combination of drivers for which the minimum value stored in the internal memory was calculated as the power consumption during execution of the sensing (Operation S108). Thereafter, the instruction unit 17e issues an instruction to control the operating device and execute the sensing to the driver included in the combination of drivers selected at Operation S108 (Operation S109), and ends the process.

(2) Second Sensing Control

Figure 13:
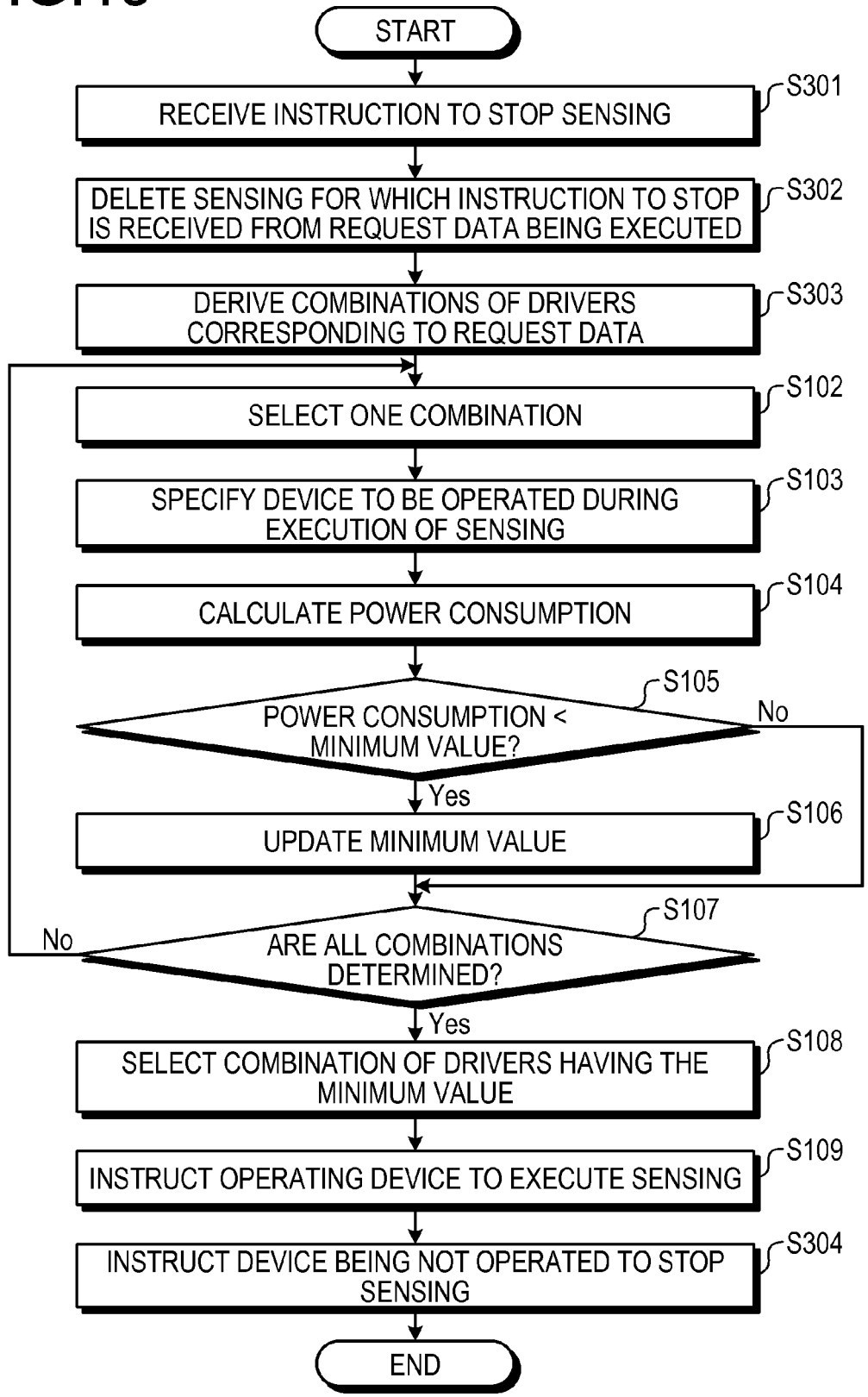
FIG. 13 is a flowchart illustrating a sequence of a second sensing control according to Second Embodiment.

FIG. 13 is a flowchart illustrating a procedural sequence of a second sensing control according to Second Embodiment. The process of the second sensing control is executed when the instruction to stop sensing is received from the application program. In the meantime, the same reference numerals are given to Operations by which the same process as that of the sensing control illustrated in FIG. 8 is executed.

As illustrated in FIG. 13, when the instruction to stop the sensing is received from the application program (Operation S301), the reception unit 25a deletes the sensing for which the instruction to stop is received at Operation S301 from the request data 21a (Operation S302).

Next, the specification unit 25b derives the combinations of drivers according to the request data 21a in which the instruction to stop has been deleted at Operation S302 (Operation S303).

Next, the specification unit 25b selects one combination of drivers among the combinations of drivers derived at Operation S303 (Operation S102). Also, the specification unit 25b specifies a device to be operated during the execution of the sensing from the combination of drivers selected at Operation S102 (Operation S103).

Thereafter, the calculation unit 17c calculates a power consumed for the sensing by each device specified at Operation S103 by referencing the operating power data 13a stored in the storage unit 13 (Operation S104).

Here, the selection unit 17d compares the power consumption calculated at Operation S104 with the minimum value of the power consumption stored in the internal memory (Operation S105). In this case, when the power consumption calculated at Operation S104 is smaller than the minimum value of the power consumption stored in the internal memory ("YES" at Operation S105), the selection unit 17d overwrites the minimum value in the internal memory with the power consumption calculated at Operation S104 to store the calculated power consumption in the internal memory (Operation S106). In the meantime, when the power consumption calculated at Operation S104 is equal to or greater than the minimum value stored in the internal memory ("NO" at Operation S105), storing the calculated power consumption in the internal memory through overwriting is not executed and the process proceeds to Operation S107.

Also, the processings of Operation S102 to Operation S106 are repeatedly executed until the comparisons of the power consumption with the minimum value for all combinations of drivers are executed ("NO" at Operation S107).

Thereafter, when the comparisons of the power consumption with the minimum value for all combinations of drivers are executed ("YES" at Operation S107), the selection unit 17d selects the combination of drivers for which the minimum value stored in the internal memory was calculated as the power consumption during the execution of the sensing (Operation S108).

Thereafter, the instruction unit 17e issues an instruction to control the operating device and execute the sensing to the driver included in the combination of drivers selected at Operation S108 (Operation S109) and an instruction to control the operating device and stop the sensing to the driver not included in the combination of drivers selected at Operation S108 (Operation S304), and ends the process.

In the meantime, even though it is exemplified in the flowchart illustrated in FIG. 13 that the processing of Operation S304 is executed after the processing of Operation S109 is executed, Operation S109 and Operation S304 may be executed by changing the processing sequence between each other, or in parallel.

As having been described above, the portable terminal device 20 according to the present embodiment calculates the power consumption of the device to be operated during the execution of the sensing for each of various combinations of sensors capable of implementing the same sensing and selects the combination in which the minimum power is consumed by the operating device, similarly to the portable terminal device 10 according to First Embodiment. Accordingly, it is possible to suppress the power consumption for the sensing by the portable terminal device 20 according to the present embodiment.

Further, the portable terminal device 20 according to the present embodiment reselects the combination of drivers in accordance with the change in the contents of sensing requested from the application program. Therefore, in the portable terminal device 20 according to the present embodiment, for example, the power consumed for the sensing may be suppressed even in a case where a plurality of application programs runs on the portable terminal device 20.

Third Embodiment

In the meantime, in First Embodiment, a case exemplified where the combination of drivers is reselected each time when the request data 21a is updated, but the combination of drivers needs not necessarily be re-selected. Accordingly, in the present embodiment, descriptions will be made on a case where the combination of drivers is selected by adding the combination of drivers for the sensing which is requested when a request for sensing is added, as an example.

[Configuration of Portable Terminal Device 30]

Figure 14:
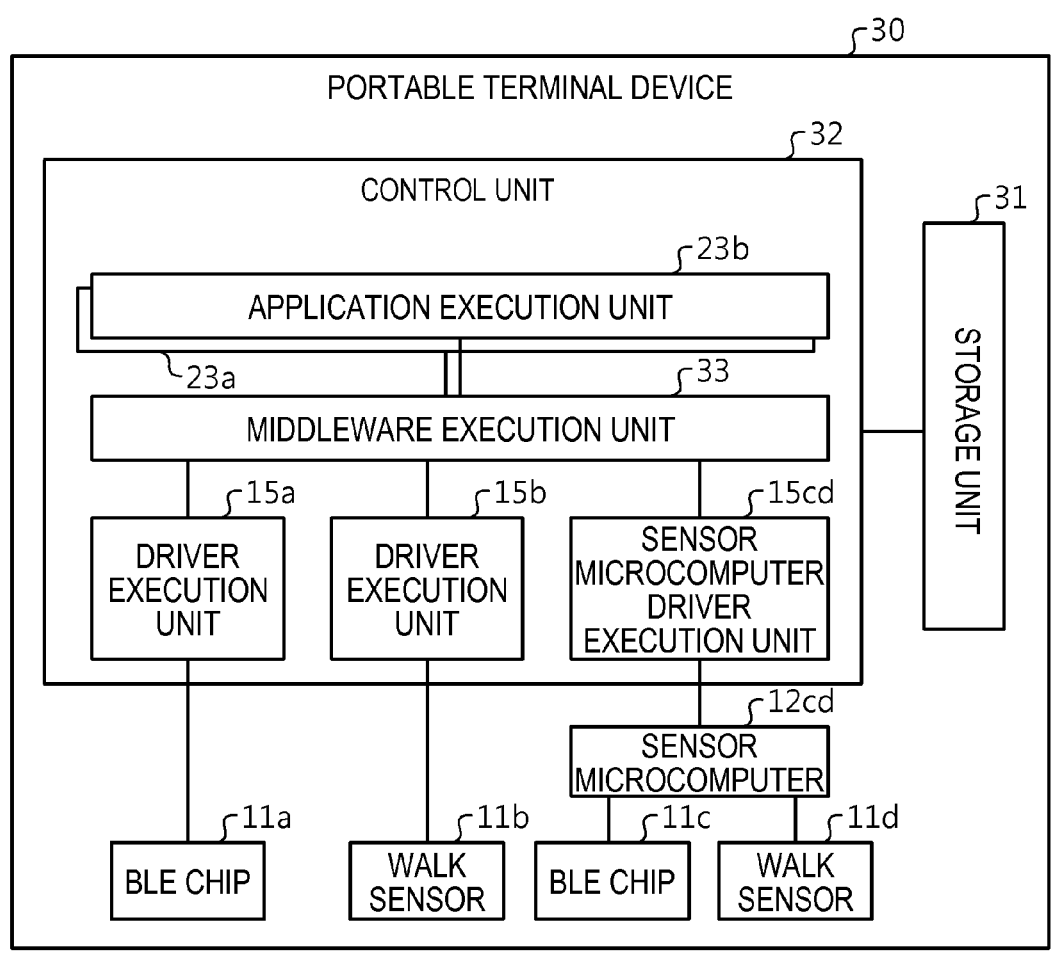
FIG. 14 is a block diagram illustrating a functional configuration of an exemplary portable terminal device according to Third Embodiment.

FIG. 14 is a block diagram illustrating a functional configuration of a portable terminal device 30 according to Third Embodiment. The portable terminal device 30 illustrated in FIG. 14 is different from the portable terminal device 20 illustrated in FIG. 9 in that the contents of data stored in the storage unit 31 and the processing contents executed by a control unit 32 are different from those stored in the storage unit 21 and those executed by the control unit 22, respectively. In the meantime, in the following, the same reference numerals are given to the functional units that implement the same functions as those of the functional units illustrated in FIG. 1, and descriptions thereof will be omitted.

Figure 15:
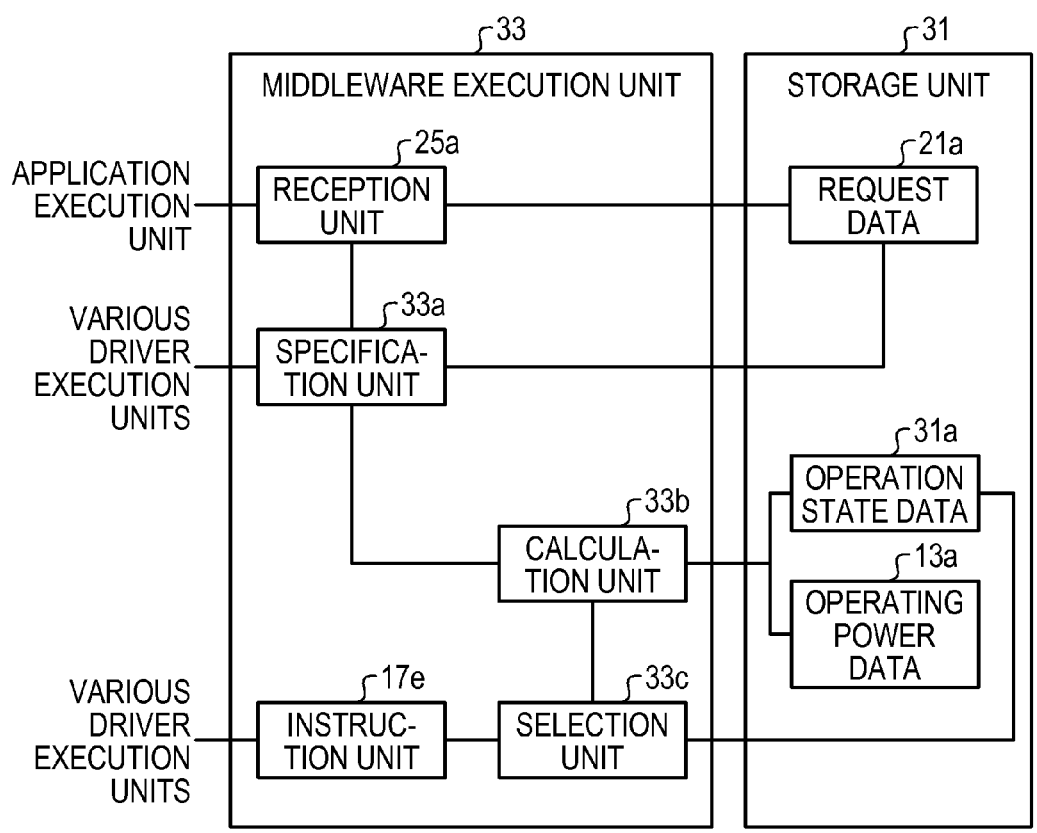
FIG. 15 is a block diagram illustrating a functional configuration of an exemplary middleware execution unit according to Third Embodiment.

FIG. 15 is a block diagram illustrating a functional configuration of a middleware execution unit 33 according to Third Embodiment. The middleware execution unit 35 illustrated in FIG. 15 is different from the middleware execution unit 25 illustrated in FIG. 10 in that the processing contents of a specification unit 33a, a calculation unit 33b, and a selection unit 33c are different from those of the middleware execution unit 25.

The specification unit 33a is a processing unit that specifies the operating device similarly to the specification unit 25b illustrated in FIG. 10, but the processing contents to be executed by the specification unit 33a when a sensing request corresponding to the instruction to execute issued from the application program is added to the request data 21a stored in the storage unit 21 are different from the specification unit 25b.

In one embodiment, when the request for the sensing is added to the request data 21a, the specification unit 33a specifies the request added before and after the request data 21a is updated. In the following, the request added before and after the request data 21a is updated may be described as an "added request" and the sensing which is additionally executed according to the "added request" may be described as an "added sensing". Thereafter, the specification unit 33a derives the combination of drivers implementing the sensing for the added request. In the following, the combination of drivers that implements the sensing for the added request may be described as "added combination of drivers" from the viewpoint of differentiating from the combinations of drivers that implement the sensing for all the requests. Thereafter, the specification unit 33a selects one of the added combinations of drivers. Next, the specification unit 33a specifies a device to be operated during the execution of an added sensing request from the added combinations of drivers selected previously. In the following, the device to be operated during the execution of the added sensing request may be described as an "added operating device". In the meantime, deriving of the added combination of drivers or specifying of the operating device may also be executed in the same manner as in the inquiry and retrieval described above.

The calculation unit 33b calculates the power consumed for sensing by the operating device for each combination similarly to the calculation unit 17c illustrated in FIG. 10, but the calculation unit 33b is different from the calculation unit 17c in that only an increment portion in the power consumed by the added operating device is calculated in the calculation unit 33b, instead of calculating the power consumption of all the operating devices as in the calculation unit 17c.

In one embodiment, the calculation unit 33b calculates the increment portion of the power consumption by the added operating devices by obtaining a total of the operating powers of all the added operating devices, but an operating power of an operating device which has been being operated before the added request is received is not added to or deleted from the total of the operating powers. For example, the calculation unit 33b subtracts the operating power associated with the same operating device as the added operating device among the operating devices included in operation state data 31a stored in the storage unit 31 from the total of the operating powers of all the added operating devices. Data in which a device under the control of the portable terminal device 30 is in association with an operation state indicating whether the device is being operated or not may be employed in the operation state data 31a, as an example. Accordingly, the power consumption increment by each operating device is calculated for each added combination of drivers.

The selection unit 33c selects the combination in which the minimum power is consumed during the execution of the sensing similarly to the selection unit 17d illustrated in FIG. 10, but the selection unit 33c is different from the selection unit 17d in that only a combination having the minimum power consumption increment during the execution of the added sensing is selected by the selection unit 33c.

In one embodiment, each time when an increment in power consumption is calculated by the calculation unit 33b, the selection unit 33c references the internal memory in which the minimum increment value of power consumption among the power consumption increments calculated up until now is stored to compare the calculated power consumption increment with the minimum increment value of power consumption in magnitude. In this case, when the power consumption increment calculated by the calculation unit 33b is smaller than the minimum increment value stored in the internal memory, the selection unit 33c overwrites the minimum increment value with the power consumption increment calculated by the calculation unit 33b to store the calculated power consumption increment in the internal memory. In the meantime, when the power consumption increment calculated by the calculation unit 33c is equal to or greater than the minimum increment value stored in the internal memory, storing the calculated power consumption increment in the internal memory through overwriting is not executed. Further, when the minimum increment value is not stored in the internal memory, the power consumption increment calculated by the calculation unit 33b is stored in the internal memory as the minimum increment value as it is. Thereafter, after the power consumption increment is calculated for all combinations, the selection unit 33c selects an added combination of drivers for which the minimum increment value stored in the internal memory was calculated as the power consumption increment during the execution of the sensing.

Next, a specific example of a sensing control according to the present embodiment will be described with reference to FIG. 16 to FIG. 19. FIG. 16 and FIG. 18 are diagrams illustrating an example of transitions of the operation state data 31a. FIG. 17 and FIG. 19 are diagrams illustrating another example of calculation results of the power consumption increments. Among FIG. 16 to FIG. 19, an example of a case where a BLE sensing is additionally requested while a walk sensing is being requested is illustrated in FIG. 16 and FIG. 17, and an example of a case where the walk sensing is additionally requested while the BLE sensing is being requested is illustrated in FIG. 18 and FIG. 19.

(1) Added Request for BLE Sensing

For example, it is assumed that a request added at time t0 is the BLE sensing. In this case, the combination of the BLE driver 15A and the combination of the sensor microcomputer driver 15CD are derived according to the correspondence relationship table illustrated in FIG. 4 as the added combinations of drivers similarly to the specific example (1) of First Embodiment.

Among the combinations of the BLE driver 15A and the sensor microcomputer driver 15CD, the BLE chip 11a is specified according to the correspondence relationship table illustrated in FIG. 4 as an added operating device for the combination of the BLE driver 15A. Next, "3 mA" is acquired as the operating power associated with the BLE chip 11a by referencing the operating power data 13a illustrated in FIG. 3. Here, a reference symbol "x" is set for the BLE chip 11a corresponding to the added operating device as an operation state among the operation state data 31a at time t0 illustrated in FIG. 16. Therefore, since the BLE chip 11a does not overlap with the operating device before the BLE chip 11a is added, the operating power of the BLE chip 11a is not cancelled, and summed as the power consumption increment by the added operating device as it is. As a result, in a case of the combination of the BLE driver 15A, the power consumption increment during the execution of the added sensing is calculated as "3 mA" as illustrated in FIG. 17.

Further, the BLE chip 11c and the sensor microcomputer 12cd are specified according to the correspondence relationship table illustrated in FIG. 4 as the added operating devices for the combination of the sensor microcomputer driver 15CD. Next, "2 mA" is acquired as the operating power of the BLE chip 11c and "4 mA" is acquired as the operating power of the sensor microcomputer 12cd by referencing the operating power data 13a illustrated in FIG. 3. Here, the BLE chip 11c and the sensor microcomputer 12cd corresponding to the added operating devices are retrieved from the operation state data 31a at time t0 illustrated in FIG. 16. Among the operating states of the retrieved operating devices, "x" is set for the operation state of the BLE chip 11c, but "o" is set for the operation state of the sensor microcomputer 12cd due to the walk sensing being requested. Therefore, the operating power of the sensor microcomputer 12cd is subtracted from the total of the operating powers of the BLE chip 11c and the sensor microcomputer 12cd. As a result, in a case of the combination of the sensor microcomputer driver 15CD, the power consumption increment during the execution of the added sensing is calculated as "2 mA (=2 mA+4 mA−4 mA)".

As described above, the power consumption increment of "3 mA" is obtained for the combination of the BLE driver 15A, and the power consumption increment of "2 mA" is obtained for the combination of the sensor microcomputer driver 15CD. In this case, the combination of the sensor microcomputer driver 15CD having the smaller power consumption increment is selected. As a result, the instruction unit 17e issues an instruction to control the BLE chip 11c and the sensor microcomputer 12cd and execute the BLE sensing, to the sensor microcomputer driver 15CD. Accordingly, the operating states of the BLE chip 11c and the sensor microcomputer 12cd are updated with the reference symbol of "o" similarly as in the operation state data 31a at time t1 illustrated in FIG. 16.

(2) Added Request of Walk Sensing

For example, it is assumed that a request added at time t0 is the BLE sensing. In this case, the combination of the walk sensor driver 15B and the combination of the sensor microcomputer driver 15CD are derived according to the correspondence relationship table illustrated in FIG. 6 as the added combinations of the drivers similarly to the specific example (2) of First Embodiment.

Among the combinations of the walk sensor driver 15B and the sensor microcomputer driver 15CD, the walk sensor 11b and the CPU 32 are specified according to the correspondence relationship table illustrated in FIG. 6 as the added operating devices for the combination of the walk sensor driver 15B. Next, "1 mA" is acquired as the operating power of the walk sensor 11b and "20 mA" is acquired as the operating power of the CPU 32 by referencing the operating power data 13a illustrated in FIG. 3. Here, the reference symbol of "x" is set for the walk sensor 11b and the CPU 32 corresponding to the added operating devices as the operation state among the operation state data 31a at time t0 illustrated in FIG. 18. Therefore, since the walk sensor 11b and the CPU 32 do not overlap with the operating devices before the walk sensor 11b and the CPU 32 are added, the total of the operating powers of the walk sensor 11b and the CPU 32 are not cancelled and summed as the power consumption increments by the added operating devices as they are. As a result, in a case of the combination of the walk sensor driver 15B, the power consumption increment during the execution of the added sensing is calculated as "21 mA" as illustrated in FIG. 19.

Further, the walk sensor 11d and the sensor microcomputer 12cd are specified according to the correspondence relationship table illustrated in FIG. 6 as the added operating devices for the combination of the sensor microcomputer driver 15CD. Next, "1 mA" is acquired as the operating power of the walk sensor 11d, and "4 mA" is acquired as the operating power of the sensor microcomputer 12cd by referencing the operating power data 13a illustrated in FIG. 3. Here, the walk sensor 11d and the sensor microcomputer 12cd corresponding to the added operating devices are retrieved from the operation state data 31a at time t0 illustrated in FIG. 18. In the meantime, the reference symbol of "x" is set for both the walk sensor 11d and the sensor microcomputer 12cd as the operation state. Therefore, since the walk sensor 11d and the sensor microcomputer 12cd do not overlap with the operating devices before the walk sensor 11d and the sensor microcomputer 12cd are added, the total of the operating powers of the walk sensor 11d and the sensor microcomputer 12cd are not cancelled and summed as the power consumption increments by the added operating devices as they are. As a result, in a case of the combination of the sensor microcomputer driver 15CD, the power consumption increment during the execution of the added sensing is calculated as "5 mA" as illustrated in FIG. 19.

As described above, the power consumption increment of "21 mA" is obtained for the combination of the walk sensor driver 15B, and the power consumption increment of "5 mA" is obtained for the combination of the sensor microcomputer driver 15CD. In this case, the combination of the sensor microcomputer driver 15CD having the smaller power consumption increment is selected. As a result, the instruction unit 17e issues an instruction to control the walk sensor 11d and the sensor microcomputer 12cd and execute the walk sensing, to the sensor microcomputer driver 15CD. Accordingly, the operating states of the walk sensor 11d and the sensor microcomputer 12cd are updated with the reference symbol of "o" similarly as in the operation state data 31a at time t1 illustrated in FIG. 18.

(3) One Aspect of Technical Significance

In the sensing control according to the present embodiment as in the specific examples (1) and (2), the combination of added drivers having the minimum power consumption increment among the added combinations of the drivers is selected while allowing the device continuously being operated at the time of receiving the added request. Therefore, by the sensing control according to the present embodiment, for example, it is possible to suppress the operation of the portable terminal device 30 from being unstabilized due to a frequent change of the operating device caused by reception of the added request.

[Flow of Process]

Figure 20:
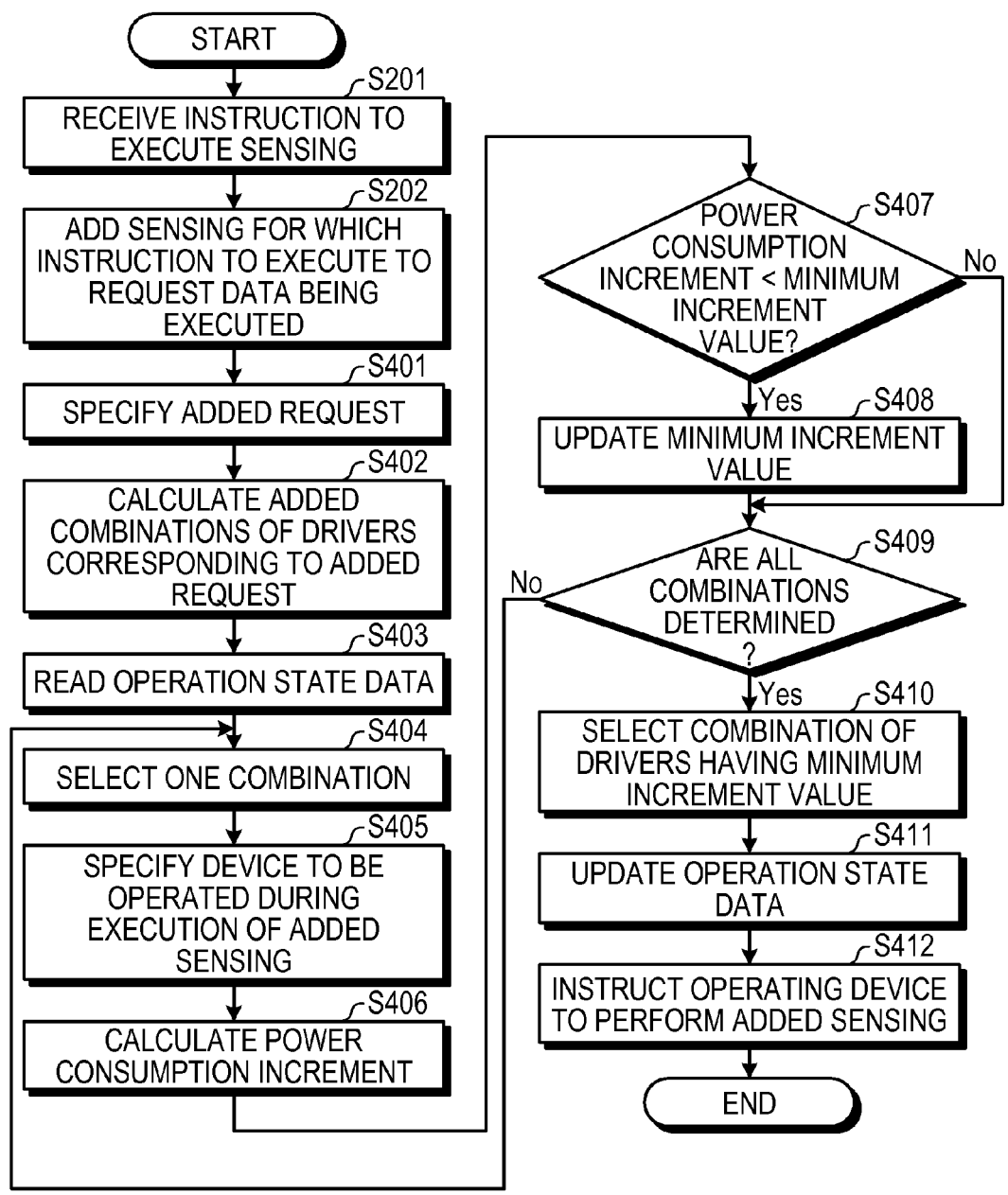
FIG. 20 is a flowchart illustrating a procedural sequence of sensing control according to Third Embodiment.

FIG. 20 is a flowchart illustrating a procedural sequence of a sensing control according to Third Embodiment. The process of the sensing control is executed when the instruction to execute sensing is received from the application program. In the meantime, the same reference numerals are given to the Operations by which the same process as that of the first sensing control illustrated in FIG. 12.

As illustrated in FIG. 20, when the instruction to execute sensing is received from the application program (Operation S201), the reception unit 25a adds the sensing for which the instruction to execute is received at Operation S201 to the request data 21a to be registered (Operation S202).

Next, the specification unit 33a specifies the request added before and after an update of the request data 21a at Operation S202 (Operation S401). Thereafter, the specification unit 33a derives the added combinations of drivers that implement the sensing operation for the added request specified at Operation S401 (Operation S402).

Thereafter, the calculation unit 33b reads the operation state data 31a stored in the storage unit 31 (Operation S403), and the specification unit 33a selects one added combination of the drivers among the added combinations of the drivers derived at Operation S402 (Operation S404). Next, the specification unit 33a specifies a device to be operated during the execution of the sensing for the added request from the combination of the drivers selected at Operation S404 (Operation S405).

Also, the calculation unit 33b calculates the power consumption increment by the added operating device by referencing the operation state data 31a read at Operation S403 (Operation S406).

Here, the selection unit 33c compares the power consumption increment calculated at Operation S406 with the minimum increment value of the power consumption stored in the internal memory (Operation S407). In this case, when the power consumption increment calculated at Operation S406 is smaller than the minimum increment value of the power consumption stored in the internal memory ("YES" at Operation S407), the selection unit 33c overwrites the minimum increment value in the internal memory with the power consumption increment calculated at Operation S406 to store the calculated power consumption increment in the internal memory (Operation S408). In the meantime, when the power consumption increment calculated at Operation S406 is equal to or greater than the minimum increment value stored in the internal memory ("NO" at Operation S105), storing the calculated power consumption increment in the internal memory through overwriting is not executed, and the process proceeds to Operation S409.

Also, the processings of Operation S404 to Operation S408 are repeatedly executed until the comparing operations of the power consumption increment with the minimum increment value for all combinations of the drivers are executed ("NO" at Operation S409).

Thereafter, when the comparing operations of the power consumption increment with the minimum increment value for all combinations of the drivers are executed ("YES" at Operation S409), the selection unit 33c selects the added combination of the drivers for which the minimum increment value stored in the internal memory was calculated as the power consumption increment during the execution of the added sensing (Operation S410). Also, the selection unit 33c updates the operation state of the added operating device corresponding to the added combination of the drivers selected at Operation S410 among the operation state data 31a during the operation (Operation S411).

Further, the instruction unit 17e issues an instruction to control the operating device and execute the sensing to the added driver included in the added combination of drivers selected at Operation S410 (Operation S412), and ends the process.

As having been described above, the portable terminal device 30 according to the present embodiment calculates the power consumption of the device to be operated during the execution of the sensing for each of various combinations of sensors capable of implementing the same sensing and selects the combination of devices, in which the minimum power is consumed by the operating device, similarly to the portable terminal device 10 according to First Embodiment. Accordingly, it is possible to suppress the power consumption of the sensing operation conducted by the portable terminal device 30 according to the present embodiment.

Further, the portable terminal device 30 according to the present embodiment selects the combination of drivers having the minimum power consumption increment among the added combinations of drivers while allowing the device continuously being operated at the time of receiving the added request. Therefore, for example, the portable terminal device 30 according to the present embodiment is able to suppress the operation of the portable terminal device 30 from being unstabilized due to a frequent change of the operating device caused by the reception of added requests.

Fourth Embodiment

In the meantime, embodiments of the apparatus according to the present disclosure has been described, but the present disclosure may be implemented by various embodiments other than the embodiments described above. Accordingly, in the following, other embodiments included in the present disclosure will be described.

[Use of Sensor Installed in External Apparatus]

In First Embodiment to Third Embodiment described above, the cases have been described where the portable terminal devices 10, 20, and 30 use the sensor having been installed therein at the time of the product shipment, but a sensor installed in an external apparatus for sensing may equally be used as well. For example, a wearable gadget such as a "smart watch" equipped with a pedometer or a blood-pressure meter, or a "ring gadget" equipped with an acceleration sensor may be connected with the portable terminal devices 10, 20, and 30 via wired or wirelessly such that the wearable gadget may be controlled by the portable terminal devices 10, 20, and 30. In this case, when the portable terminal device 20 is allowed to perform the same processes as those of FIG. 12 and FIG. 13 each time when connection or disconnection of a wearable device such as the wearable gadget is detected, the portable terminal device 30 may be allowed to perform the same process as that of FIG. 20.

[Operation Time]

In First Embodiment to Third Embodiment described above, a case where the combination of the drivers is selected based on the power consumption, but other item, for example, an operation time may also be added to a criteria for selection. For example, it is assumed that a battery of a main body of the portable terminal device and a battery of a gadget connected with the portable terminal device exist. In this case, the portable terminal device calculates a total power consumption of the device operated by a battery for each battery using a power source data in which a device and the battery used as a power source of the device are associated with each other. Also, the portable terminal device calculates an operation time from the total of the power consumption of each battery for each combination of the drivers using the data of the battery remaining power in which the remaining power of the battery is associated with each battery. Next, the portable terminal device calculates an evaluation value from the power consumption and the operation time for each combination of the drivers. Thereafter, the portable terminal device selects the combination of the drivers having the best evaluation value. In the meantime, the portable terminal device may select the combination of drivers having the minimum power consumption among the combinations of drivers of which an operation time is equal to or greater than a predetermined period of time without having to calculate the evaluation value. In the meantime, the portable terminal device may ignore the power consumption and select the combination of drivers having the longest operation time.

[Sensing Control Program]

Further, various processes described in the embodiments may be implemented by executing a prepared program by a computer such as a personal computer or a workstation. Accordingly, in the following, descriptions will be made on an example of the computer which executes the sensing control program equipped with the same function as the embodiments described above with reference to FIG. 21.

Figure 21:
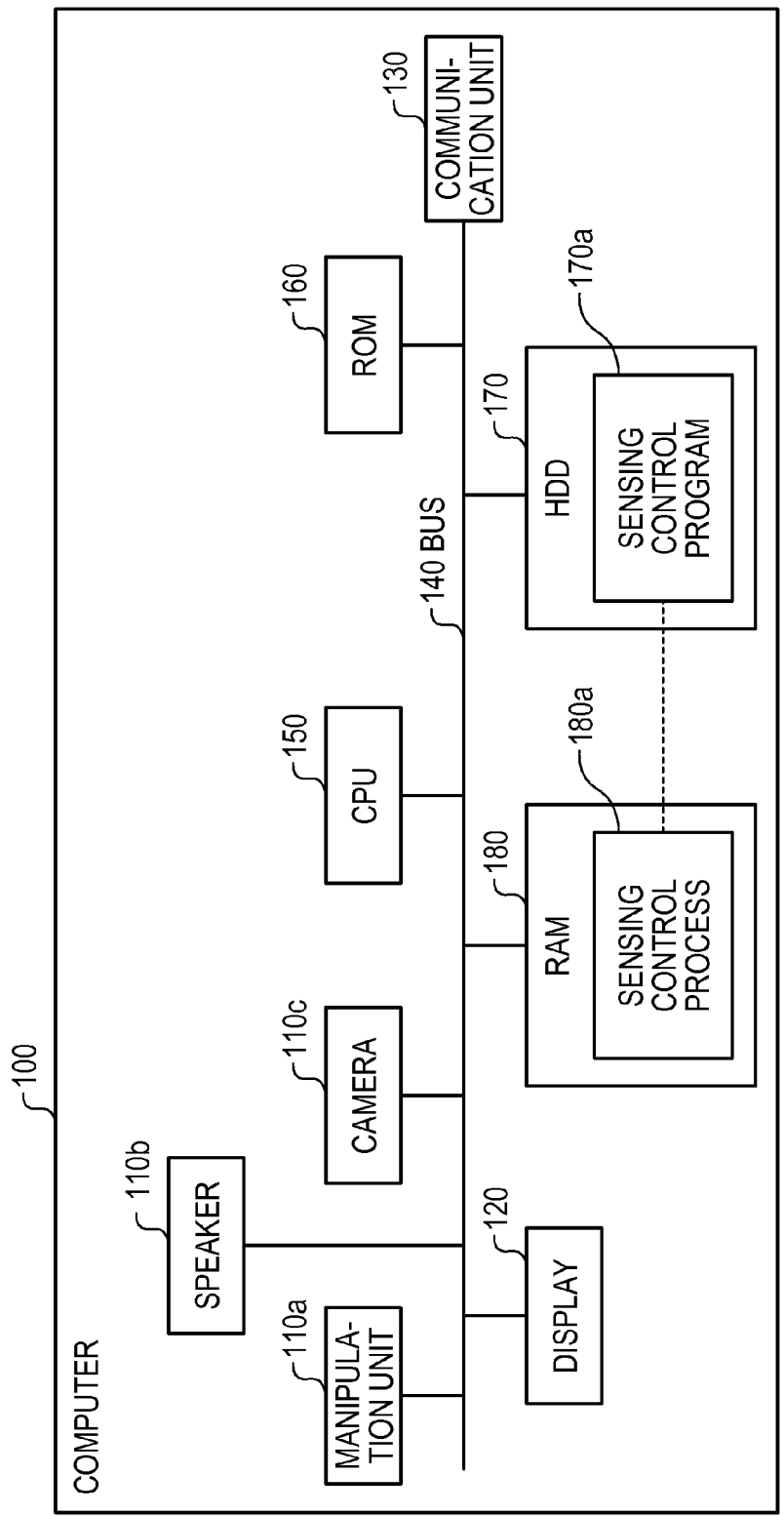
FIG. 21 is a block diagram illustrating an exemplary computer which executes sensing control programs according to First Embodiment through Fourth Embodiment.

FIG. 21 is a block diagram illustrating an exemplary computer which executes the sensing control programs according to First Embodiment through Fourth Embodiment. As illustrated in FIG. 21, a computer 100 includes a manipulation unit 110a, a speaker 110b, a camera 110c, a display 120, and a communication unit 130. Further, the computer 100 includes a CPU 150, a ROM 160, a HDD 170, and a RAM 180. These units 110, 120, 130, 140, 150, 160, 170, and 180 are connected with one another via a bus 140.

In the HDD 170, as illustrated in FIG. 21, a sensing control program 170a which implements the same functions as the middleware execution units described in First Embodiment to Third Embodiment is stored in advance. In the sensing control program 170a, respective functions may be appropriately integrated or separated similarly to respective constitutional elements of respective functional units illustrated in FIG. 2, FIG. 10, or FIG. 15. That is, all of the data to be stored in the HDD 170 need not necessarily be stored in the HDD 170 and only the data used for the process needs to be stored in the HDD 170.

Also, the CPU 150 reads the sensing control program 170a from the HDD 170 to be deployed in the RAM 180. Accordingly, the sensing control program 170a functions as a sensing control process 180a as illustrated in FIG. 21. The sensing control process 180a deploys various data read from the HDD 170 in an area allocated for the sensing control process 180a on the RAM 180, and executes various processes based on the deployed various data. In the meantime, the sensing control process 180a includes the processings executed in the functional units illustrated in FIG. 2, FIG. 10, or FIG. 15, for example, the processes illustrated in FIG. 12, FIG. 13, or FIG. 20. Further, all the processing units virtually implemented in the CPU 150 need not necessarily be operated on the CPU 150, and only the processing unit used for the process needs to be virtually implemented.

In the meantime, the sensing control program 170a needs not necessarily be stored in the HDD 170 or the ROM 160 from the beginning. For example, each program may be stored in a "portable physical medium", such as for example, a flexible disk what is called FD, a CD-ROM, a DVD disk, an opto-magnetic disk, or an IC card to be inserted in the computer 100. Also, the computer 100 may acquire each program from the portable physical medium to be executed. Further, each program is stored in other computer or a server apparatus connected to the computer 100 through, for example, a public network, the Internet, the LAN, the WAN and then, the computer 100 may acquire each program from the other computer or the server apparatus to be executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A portable terminal device comprising:
   at least one processor; and
   at least one memory which stores a plurality of instructions, which when executed by the at least one processor, cause the at least one processor to execute:
   receiving an instruction to execute sensing;
   specifying one or more sensors for executing the sensing or one or more drivers controlling the sensors so that devices including the specified sensor and driver are specified;
   calculating a power consumed for the sensing by the specified devices based on power data;
   determining a combination of driver and sensor consuming lowest amount of power for the sensing by the specified devices; and
   selecting the determined combination of the driver and the sensor.

2. The portable terminal device according to claim 1, wherein, in a case where a plurality of sensings are executed, when an instruction to stop any one of the plurality of sensings is received, the specifying, the calculating and the selecting in the process are executed.

3. The portable terminal device according to claim 1, wherein, in a case where a plurality of sensings are executed, one or more sensors for executing the sensing being installed in an external apparatus, when connection or disconnection of the external apparatus is detected, the specifying, the calculating and the selecting in the process are executed.

4. The portable terminal device according to claim 1, wherein, in a case where a plurality of sensings are executed, when an instruction for executing a new sensing, the device including sensors and drivers which implement the new sensing is specified and the calculating and the selecting in the process are executed.

5. The portable terminal device according to claim 1, wherein the combination of the driver and the sensor is selected according to the power consumed for the sensing and an operatable time of the device based on a remaining power of a battery in a portable terminal device.

6. A non-transitory computer-readable recording medium having stored therein a program for causing a computer to execute a process, the process comprising:
   receiving an instruction to execute sensing;
   specifying one or more sensors for executing the sensing or one or more drivers controlling the sensors so that devices including the specified sensor and driver are specified;
   calculating a power consumed for the sensing by the specified devices based on power data;
   determining a combination of driver and sensor consuming lowest amount of power for the sensing by the specified devices; and
   selecting the determined combination of the driver and the sensor.

* * * * *